US012272478B2

(12) United States Patent
Tanaka et al.

(10) Patent No.: US 12,272,478 B2
(45) Date of Patent: Apr. 8, 2025

(54) COMMON MODE CHOKE COIL

(71) Applicant: Murata Manufacturing Co., Ltd., Kyoto-fu (JP)

(72) Inventors: Kenji Tanaka, Nagaokakyo (JP); Naoyuki Murakami, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 951 days.

(21) Appl. No.: 17/336,218

(22) Filed: Jun. 1, 2021

(65) Prior Publication Data

US 2021/0391107 A1 Dec. 16, 2021

(30) Foreign Application Priority Data

Jun. 16, 2020 (JP) ................................ 2020-103932

(51) Int. Cl.

| | |
|---|---|
| ***H01F 5/00*** | (2006.01) |
| ***H01F 17/00*** | (2006.01) |
| ***H01F 27/28*** | (2006.01) |
| ***H01F 27/29*** | (2006.01) |

(52) U.S. Cl.

CPC ..... *H01F 17/0013* (2013.01); *H01F 27/2804* (2013.01); *H01F 27/292* (2013.01); *H01F 2017/0073* (2013.01); *H01F 2017/0093* (2013.01); *H01F 2027/2809* (2013.01)

(58) Field of Classification Search

CPC .................................................. H01F 27/2804
USPC ........................................................ 336/200
See application file for complete search history.

(56) References Cited

U.S. PATENT DOCUMENTS

2016/0133374 A1* 5/2016 Inui ...................... H01F 27/292 336/192

FOREIGN PATENT DOCUMENTS

| | | | |
|---|---|---|---|
| CN | 110120291 | A | 8/2019 |
| JP | 2011-029362 | A | 2/2011 |
| JP | 2012-182285 | A | 9/2012 |
| JP | 2018-67559 | A | 4/2018 |
| JP | 2019-140170 | A | 8/2019 |

OTHER PUBLICATIONS

English translation of JP2011029362 (Year: 2011).*

* cited by examiner

*Primary Examiner* — Ronald Hinson
(74) *Attorney, Agent, or Firm* — Studebaker Brackett PLLC

(57) ABSTRACT

A common mode choke coil includes an element body of laminated insulating layers; electrically insulated first and second coils in the element body; first and second outer electrodes on the element body electrically connected to ends of the first coil; and third and fourth outer electrodes on the element body electrically connected to ends of the second coil. The first coil includes first to third coil conductors on first to third insulating layers. The second coil includes fourth to sixth coil conductor on fourth to sixth insulating layers. The second and third coil conductors are electrically connected via a via conductor overlapping at outer ends of the conductors. A dummy conductor overlapping the via conductor is provided on at least one of the first, fourth, fifth, and sixth insulating layers other than between the second and third insulating layers and electrically insulated from all the coil conductors.

20 Claims, 5 Drawing Sheets

COMMON MODE CHOKE COIL

CROSS-REFERENCE TO RELATED APPLICATION

This application claims benefit of priority to Japanese Patent Application No. 2020-103932, filed Jun. 16, 2020, the entire content of which is incorporated herein by reference.

BACKGROUND

Technical Field

The present disclosure relates to a common mode choke coil.

Background Art

A common mode choke coil is known as a kind of circuit noise filter. For example, Japanese Unexamined Patent Application Publication No. 2019-140170 describes a common mode choke coil. The common mode choke coil includes a laminated body made up of a plurality of laminated electrically insulating layers, a first coil and a second coil provided in the laminated body, and a first outer electrode, a second outer electrode, a third outer electrode, and a fourth outer electrode, provided on an outer surface of the laminated body. The first outer electrode and the second outer electrode are respectively electrically connected to one end and the other end of the first coil. The third outer electrode and the fourth outer electrode are respectively electrically connected to one end and the other end of the second coil. The first coil includes at least a first spiral conductor, a second spiral conductor, and a third spiral conductor connected to one another through via conductors in a lamination direction of the laminated body. The second coil includes at least a fourth spiral conductor, a fifth spiral conductor, and a sixth spiral conductor connected to one another through via conductors in the lamination direction of the laminated body. In the lamination direction, the first spiral conductor is next to the second spiral conductor and the fourth spiral conductor, and the fourth spiral conductor is next to the first spiral conductor and the fifth spiral conductor. Of distances between the spiral conductors next to each other in the lamination direction, the distance between the first spiral conductor and the fourth spiral conductor is shorter than the other distances.

In the common mode choke coil described in Japanese Unexamined Patent Application Publication No. 2019-140170, as shown in FIG. 2, FIG. 3, FIG. 7, and the like of Japanese Unexamined Patent Application Publication No. 2019-140170, radially outer ends of any two of the first spiral conductor, the second spiral conductor, and the third spiral conductor are electrically connected through a via conductor. However, at the time of manufacturing such a common mode choke coil, even when a plurality of electrically insulating layers each having a spiral conductor is laminated and then the radially outer ends of the spiral conductors are attempted to be connected to the via conductor by pressure bonding, a pressure in the lamination direction is possibly difficult to be applied to a part where the radially outer ends of the spiral conductors overlap the via conductor. Thus, in such a common mode choke coil, the connectivity between the via conductor and each of the radially outer ends of the spiral conductors may become insufficient and, as a result, a break may occur in the coil.

SUMMARY

Accordingly, the present disclosure provides a common mode choke coil that excels in the connectivity between a via conductor and each of radially outer ends of coil conductors.

According to preferred embodiments of the present disclosure, a common mode choke coil includes an element body made up of a plurality of electrically insulating layers laminated in a height direction; a first coil provided in the element body; and a second coil provided in the element body and electrically insulated from the first coil. The common mode choke coil further includes a first outer electrode provided on a surface of the element body and electrically connected to one end of the first coil; a second outer electrode provided on the surface of the element body and electrically connected to an other end of the first coil; a third outer electrode provided on the surface of the element body and electrically connected to one end of the second coil; and a fourth outer electrode provided on the surface of the element body and electrically connected to an other end of the second coil. The first coil includes a first coil conductor provided on a surface of a first electrically insulating layer, a second coil conductor provided on a surface of a second electrically insulating layer, and a third coil conductor provided on a surface of a third electrically insulating layer. The first coil conductor, the second coil conductor, and the third coil conductor are laminated in the height direction together with the first electrically insulating layer, the second electrically insulating layer, and the third electrically insulating layer and electrically connected. The second coil includes a fourth coil conductor provided on a surface of a fourth electrically insulating layer, a fifth coil conductor provided on a surface of a fifth electrically insulating layer, and a sixth coil conductor provided on a surface of a sixth electrically insulating layer. The fourth coil conductor, the fifth coil conductor, and the sixth coil conductor are laminated in the height direction together with the fourth electrically insulating layer, the fifth electrically insulating layer, and the sixth electrically insulating layer and electrically connected. The second coil conductor and the third coil conductor are electrically connected via a first outer via conductor provided at a position that overlaps partially or totally a radially outer end of the second coil conductor and a radially outer end of the third coil conductor when viewed in the height direction. The common mode choke coil further includes a first dummy conductor provided on the surface of at least one of the electrically insulating layers, consisting of the first electrically insulating layer, the fourth electrically insulating layer, the fifth electrically insulating layer, and the sixth electrically insulating layer, provided at a position other than between the second electrically insulating layer and the third electrically insulating layer. The first dummy conductor overlaps partially or totally the first outer via conductor when viewed in the height direction and is electrically insulated from all the coil conductors.

Other features, elements, characteristics and advantages of the present disclosure will become more apparent from the following detailed description of preferred embodiments of the present disclosure with reference to the attached drawings.

DETAILED DESCRIPTION

Hereinafter, a common mode choke coil according to preferred embodiments of the present disclosure will be described. The present disclosure is not limited to the following configurations and may be modified as needed without departing from the scope of the present disclosure. The present disclosure also encompasses combinations of a plurality of individual preferred components described below.

Common Mode Choke Coil

Figure 1:
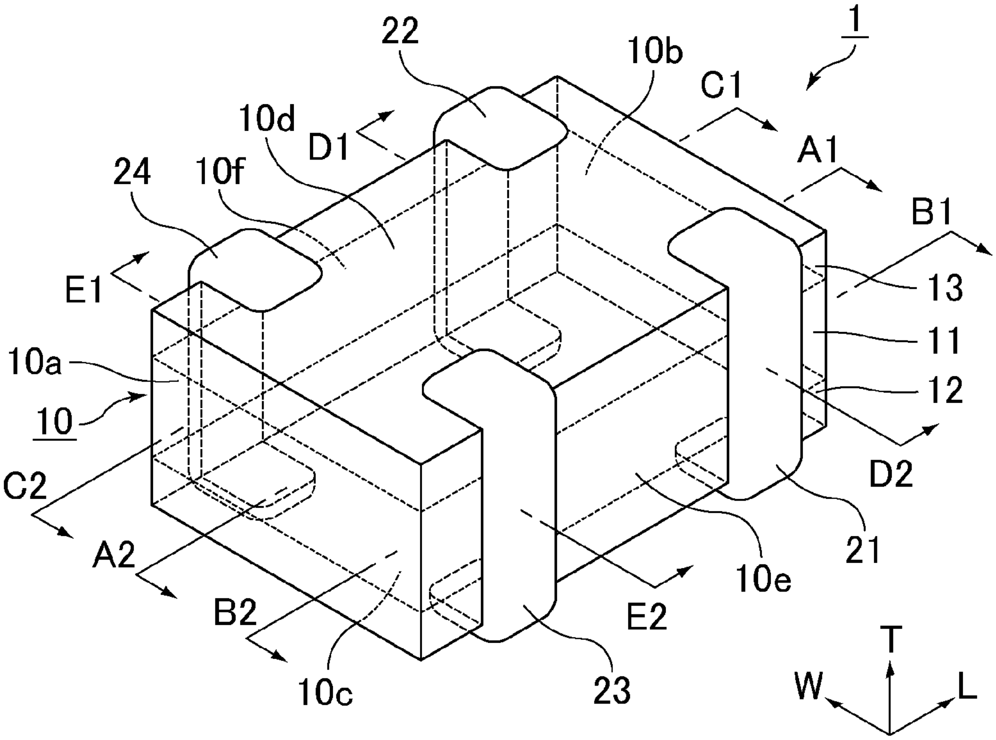
FIG. 1 is a schematic perspective view showing an example of a common mode choke coil according to preferred embodiments of the present disclosure.

FIG. 1 is a schematic perspective view showing an example of a common mode choke coil according to the preferred embodiments of the present disclosure.

As shown in FIG. 1, a common mode choke coil 1 includes an element body 10, a first outer electrode 21, a second outer electrode 22, a third outer electrode 23, and a fourth outer electrode 24. Although not shown in FIG. 1, as will be described later, the common mode choke coil 1 also includes a first coil and a second coil provided in the element body 10.

In the specification, a length direction, a height direction, and a width direction are defined as directions respectively indicated by L, T, and W as shown in FIG. 1 and other drawings. The length direction L, the height direction T, and the width direction W are perpendicular to one another.

The element body 10 has a substantially rectangular parallelepiped shape. The element body 10 has a first end surface 10*a* and a second end surface 10*b* facing in the length direction L, a first main surface 10*c* and a second main surface 10*d* facing in the height direction T, and a first side surface 10*e* and a second side surface 10*f* facing in the width direction W.

When the common mode choke coil 1 is mounted on a substrate, the first main surface 10*c* or second main surface 10*d* of the element body 10 becomes a mounting surface.

The first end surface 10*a* and second end surface 10*b* of the element body 10 do not need to be strictly perpendicular to the length direction L. The first main surface 10*c* and second main surface d of the element body 10 do not need to be strictly perpendicular to the height direction T. The first side surface 10*e* and second side surface 10*f* of the element body 10 do not need to be strictly perpendicular to the width direction W.

In the element body 10, corner portions and ridge portions are desirably rounded. Each of the corner portions of the element body 10 is a portion where three sides of the element body 10 intersect with one another. Each of the ridge portions of the element body 10 is a portion where two sides of the element body 10 intersect with each other.

The element body 10 is made up of a plurality of electrically insulating layers laminated in the height direction T. More specifically, the element body 10 has a ferrite layer 12, a glass ceramic layer 11, and a ferrite layer 13 in order from the first main surface 10*c* toward the second main surface 10*d*. In other words, the element body 10 has such a configuration that the glass ceramic layer 11 is sandwiched by the ferrite layer 12 and the ferrite layer 13 in the height direction T.

The glass ceramic layer 11 has a multilayer structure in which a plurality of electrically insulating layers is laminated as will be described later.

A glass ceramic material of the glass ceramic layer 11 desirably contains a glass material containing at least K, B, and Si.

A glass material desirably contains higher than or equal to about 0.5 weight percent and lower than or equal to about 5 weight percent (i.e., from about 0.5 weight percent to about 5 weight percent) of K in terms of $K_2O$, higher than or equal to about 10 weight percent and lower than or equal to about 25 weight percent (i.e., from about 10 weight percent to about 25 weight percent) of B in terms of $B_2O_3$, higher than or equal to about 70 weight percent and lower than or equal to about 85 weight percent (i.e., from about 70 weight percent to about 85 weight percent) of Si in terms of $SiO_2$, and higher than or equal to about 0 weight percent and lower than or equal to about 5 weight percent (i.e., from about 0 weight percent to about 5 weight percent) of Al in terms of $Al_2O_3$.

A glass ceramic material desirably contains $SiO_2$ (quartz) and $Al_2O_3$ (alumina) as fillers in addition to the above-described glass material. In this case, a glass ceramic material desirably contains higher than or equal to about 60 weight percent and lower than or equal to about 66 weight percent (i.e., from about 60 weight percent to about 66 weight percent) of a glass material, higher than or equal to about 34 weight percent and lower than or equal to about 37 weight percent (i.e., from about 34 weight percent to about 37 weight percent) of $SiO_2$ as a filler, and higher than or equal to about 0.5 weight percent and lower than or equal to about 4 weight percent (i.e., from about 0.5 weight percent to about 4 weight percent) of $Al_2O_3$ as a filler. Since the glass ceramic material contains $SiO_2$ as a filler, the radio-frequency characteristics of the common mode choke coil 1 improve. Since the glass ceramic material contains $Al_2O_3$ as a filler, the mechanical strength of the element body 10 is enhanced.

The ferrite layer 12 and the ferrite layer 13 each may have a single layer structure or may have a multilayer structure.

A ferrite material of each of the ferrite layer 12 and the ferrite layer 13 is desirably an Ni—Cu—Zn ferrite material. When the ferrite layer 12 and the ferrite layer 13 are made of an Ni—Cu—Zn ferrite material, the inductance of the common mode choke coil 1 increases.

An Ni—Cu—Zn ferrite material desirably contains higher than or equal to about 40 mole percent and lower than or equal to about 49.5 mole percent (i.e., from about 40 mole percent to about 49.5 mole percent) of $Fe_2O_3$, higher than or equal to about 5 mole percent and lower than or equal to about 35 mole percent (i.e., from about 5 mole percent to about 35 mole percent) of ZnO, higher than or equal to about 6 mole percent and lower than or equal to about 12 mole percent (i.e., from about 6 mole percent to about 12 mole percent) of CuO, and higher than or equal to about 8 mole percent and lower than or equal to about 40 mole percent (i.e., from about 8 mole percent to about 40 mole percent) of NiO. These oxides may contain inevitable impurities.

An Ni—Cu—Zn ferrite material may contain an additive, such as $Mn_3O_4$, $Co_3O_4$, $SnO_2$, $Bi_2O_3$, and $SiO_2$.

The first outer electrode 21 is provided on the surface of the element body 10. More specifically, the first outer electrode 21 extends over part of each of the first main surface 10*c*, first side surface 10*e*, and second main surface 10*d* of the element body 10.

The second outer electrode 22 is provided on the surface of the element body 10. More specifically, the second outer electrode 22 extends over part of each of the first main surface 10*c*, second side surface 10*f*, and second main surface 10*d* of the element body 10. The second outer electrode 22 is provided at a position facing the first outer electrode 21 in the width direction W.

The third outer electrode 23 is provided on the surface of the element body 10. More specifically, the third outer electrode 23 extends over part of each of the first main surface 10*c*, first side surface 10*e*, and second main surface 10*d* of the element body 10 at a position spaced apart from the first outer electrode 21 in the length direction L.

The fourth outer electrode 24 is provided on the surface of the element body 10. More specifically, the fourth outer electrode 24 extends over part of each of the first main surface 10*c*, second side surface 10*f*, and second main surface 10*d* of the element body 10 at a position spaced apart from the second outer electrode 22 in the length direction L. The fourth outer electrode 24 is provided at a position facing the third outer electrode 23 in the width direction W.

The first outer electrode 21, the second outer electrode 22, the third outer electrode 23, and the fourth outer electrode 24 each may have a single layer structure or may have a multilayer structure.

When the first outer electrode 21, the second outer electrode 22, the third outer electrode 23, and the fourth outer electrode 24 each have a single layer structure, examples of the constituent material of each outer electrode include Ag, Au, Cu, Pd, Ni, Al, and alloys each containing at least one of these metals.

When the first outer electrode 21, the second outer electrode 22, the third outer electrode 23, and the fourth outer electrode 24 each have a multilayer structure, each outer electrode may have, for example, a base electrode layer containing Ag, an Ni plating layer, and an Sn plating layer in order from the surface side of the element body 10.

Figure 2:
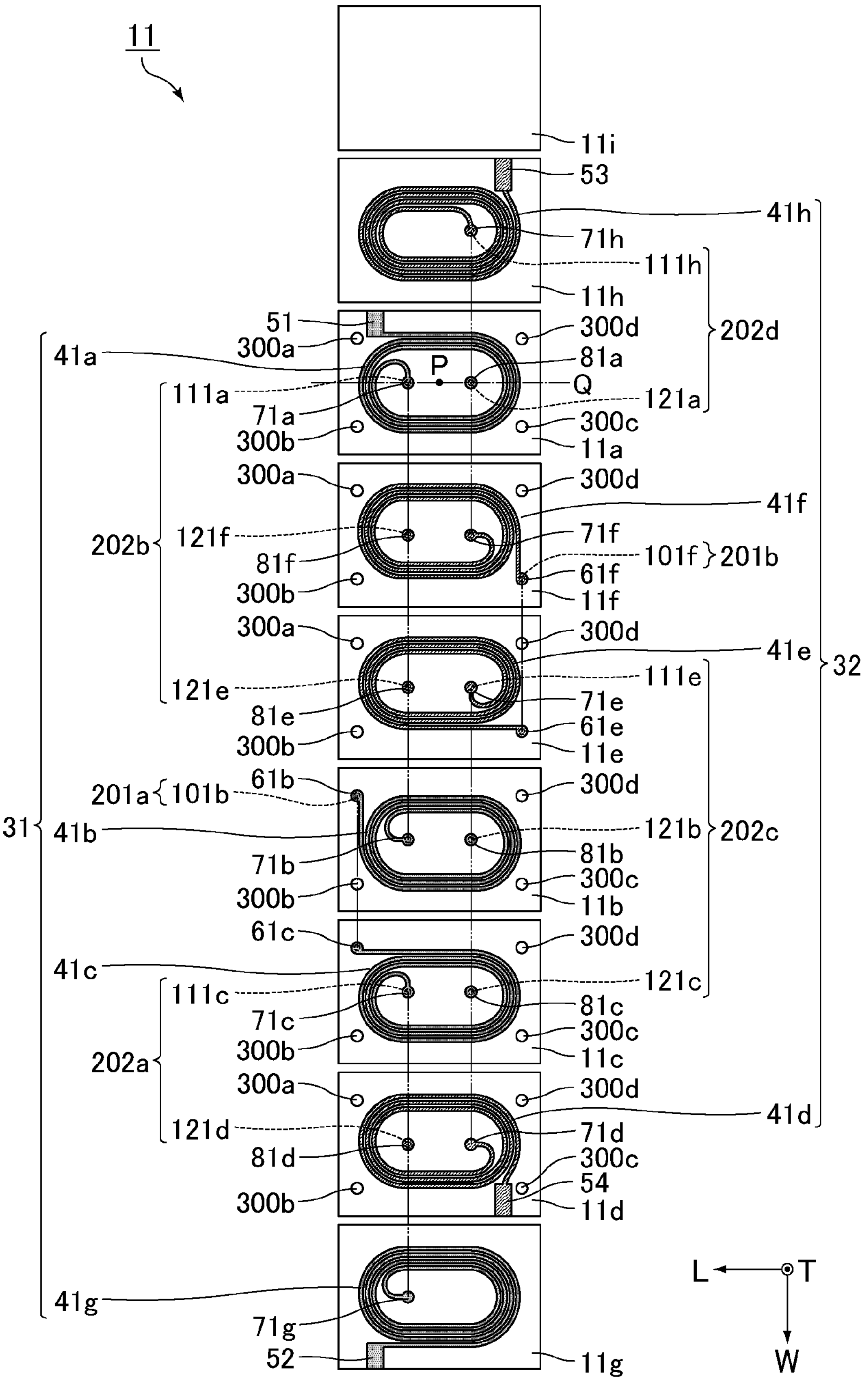
FIG. 2 is an exploded schematic plan view showing an example of the internal structure of an element body shown in FIG. 1.
Figure 3:
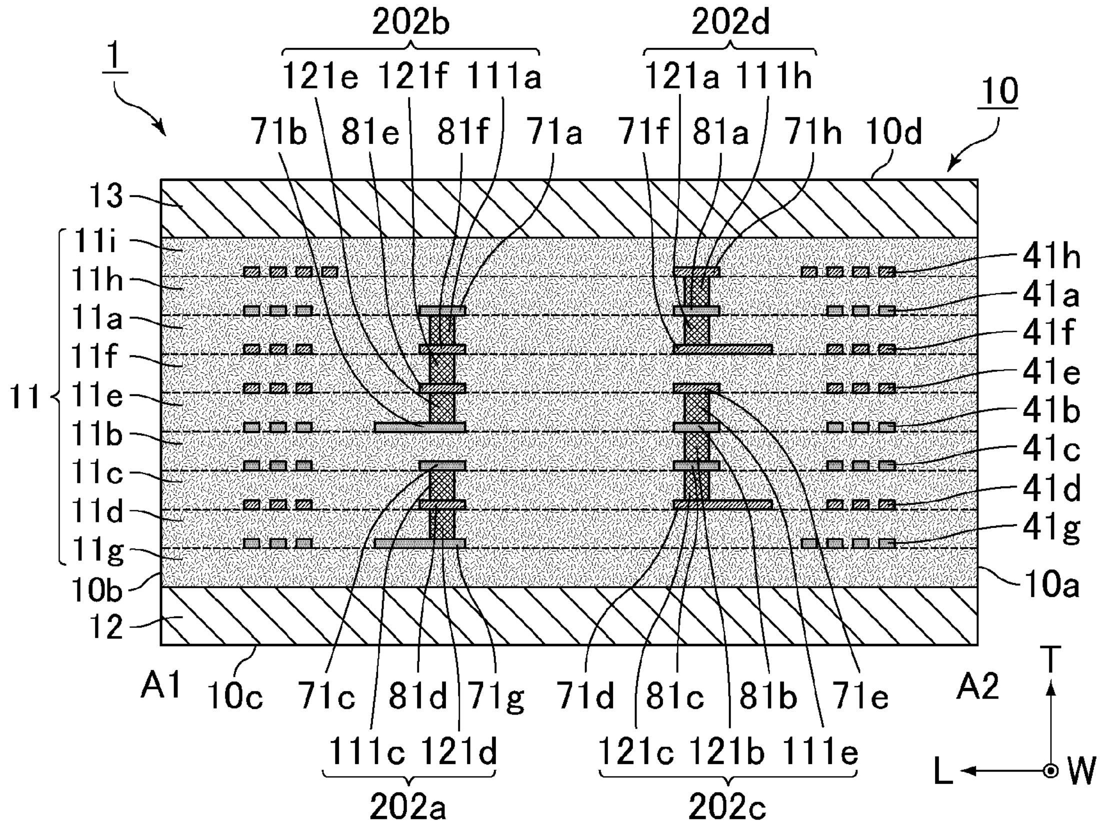
FIG. 3 is a schematic cross-sectional view taken along the line A1-A2 in FIG. 1.
Figure 4:
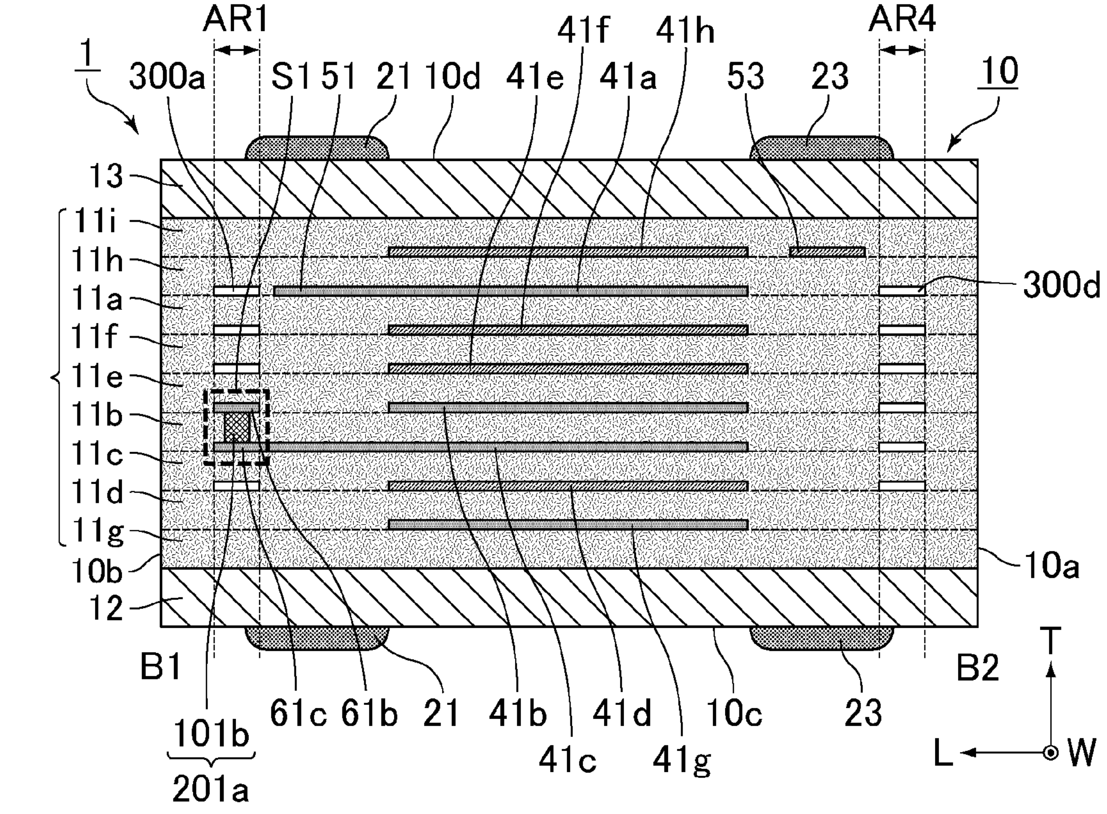
FIG. 4 is a schematic cross-sectional view taken along the line B1-B2 in FIG. 1.
Figure 5:
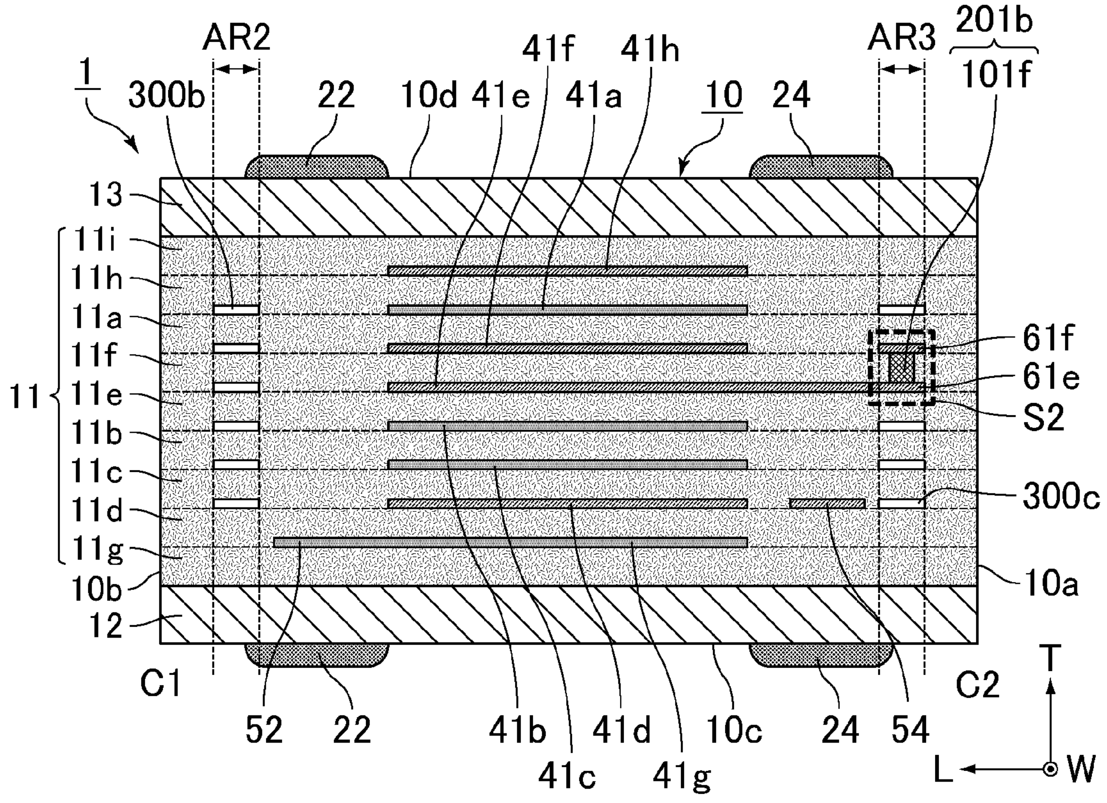
FIG. 5 is a schematic cross-sectional view taken along the line C1-C2 in FIG. 1.
Figure 6:
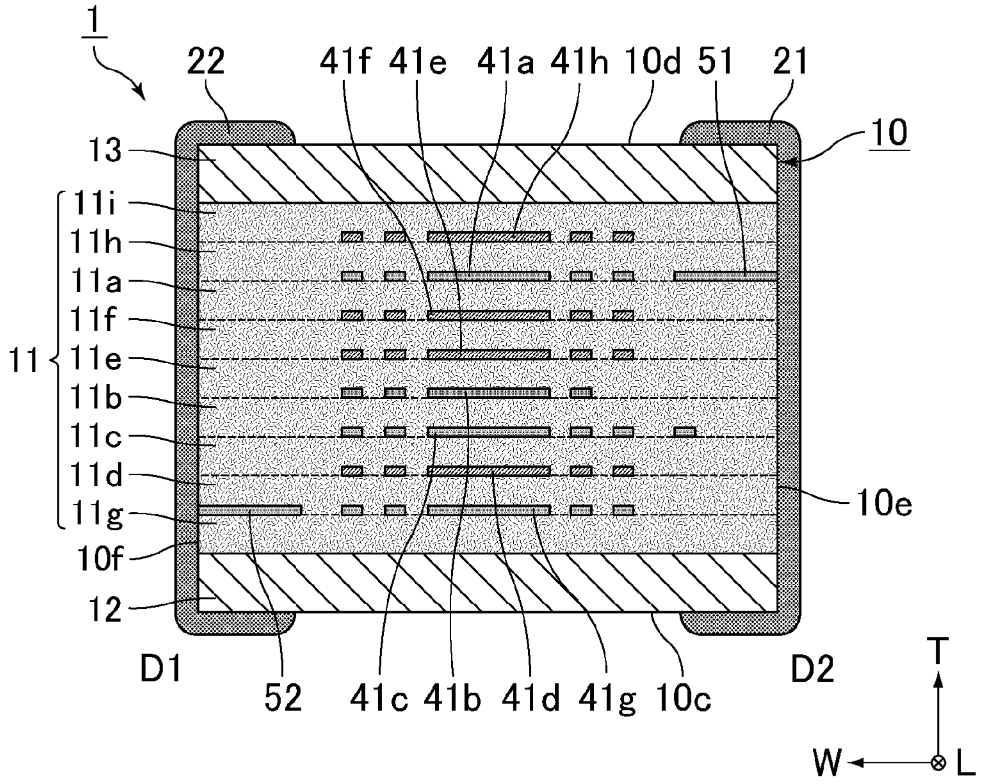
FIG. 6 is a schematic cross-sectional view taken along the line D1-D2 in FIG. 1.
Figure 7:
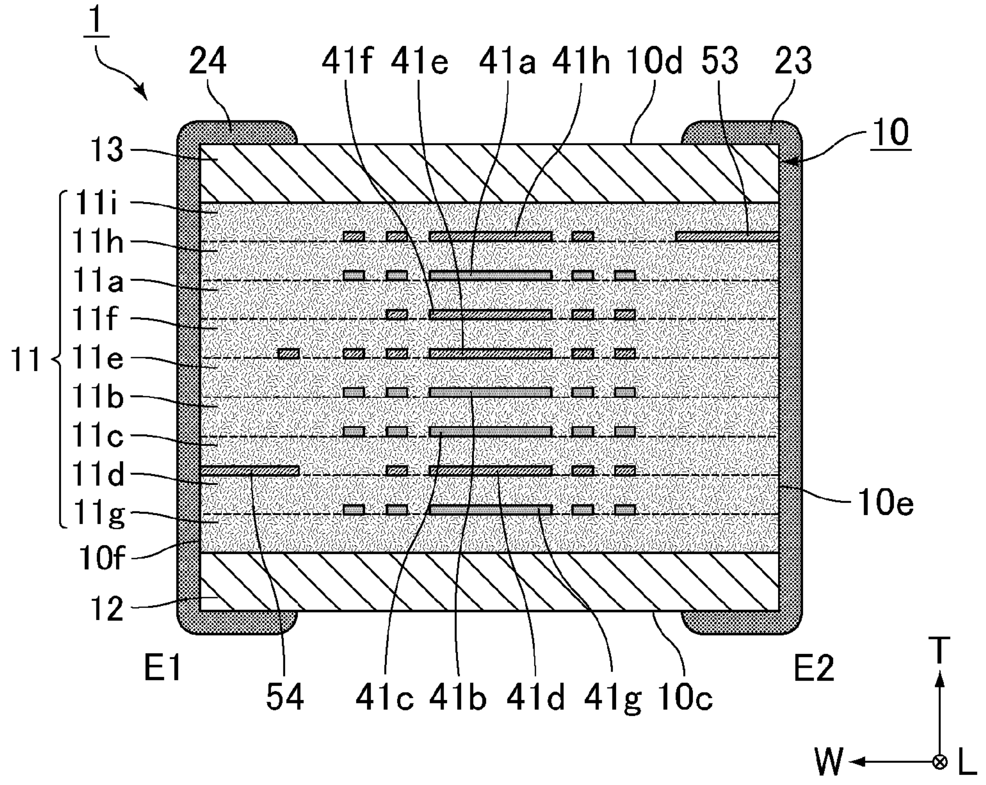
FIG. 7 is a schematic cross-sectional view taken along the line E1-E2 in FIG. 1.

FIG. 2 is an exploded schematic plan view showing an example of the internal structure of the element body shown in FIG. 1. FIG. 3 is a schematic cross-sectional view taken along the line A1-A2 in FIG. 1. FIG. 4 is a schematic cross-sectional view taken along the line B1-B2 in FIG. 1. FIG. 5 is a schematic cross-sectional view taken along the line C1-C2 in FIG. 1. FIG. 6 is a schematic cross-sectional view taken along the line D1-D2 in FIG. 1. FIG. 7 is a schematic cross-sectional view taken along the line E1-E2 in FIG. 1.

As shown in FIG. 2, FIG. 3, FIG. 4, FIG. 5, FIG. 6, and FIG. 7, the glass ceramic layer 11 that is a component of the element body 10 is formed such that a plurality of electrically insulating layers including a first electrically insulating layer 11*a*, a second electrically insulating layer 11*b*, a third electrically insulating layer 11*c*, a fourth electrically insulating layer 11*d*, a fifth electrically insulating layer 11*e*, a sixth electrically insulating layer 11*f*, a seventh electrically insulating layer 11*g*, and an eighth electrically insulating layer 11*h* are laminated in the height direction T. In the element body 10, more specifically, in the glass ceramic layer 11, the seventh electrically insulating layer 11*g*, the fourth electrically insulating layer 11*d*, the third electrically insulating layer 11*c*, the second electrically insulating layer 11*b*, the fifth electrically insulating layer 11*e*, the sixth electrically insulating layer 11*f*, the first electrically insulating layer 11*a*, and the eighth electrically insulating layer 11*h* are laminated in order in the height direction T. In the element body 10, the seventh electrically insulating layer 11*g* is located closer to the first main surface 10*c*, and the eighth electrically insulating layer 11*h* is located closer to the second main surface 10*d*.

The constituent materials of the first electrically insulating layer 11*a*, second electrically insulating layer 11*b*, third electrically insulating layer 11*c*, fourth electrically insulating layer 11*d*, fifth electrically insulating layer 11*e*, sixth electrically insulating layer 11*f*, seventh electrically insulating layer 11*g*, and eighth electrically insulating layer 11*h* are desirably the same as one another.

In the glass ceramic layer 11, at least one electrically insulating layer in which no conductor portions, such as coil conductors, extended electrodes, via conductors, and dummy conductors (described later), are provided may be laminated on at least one of the first main surface 10*c* side of the seventh electrically insulating layer 11*g* and the second main surface 10*d* side of the eighth electrically insulating layer 11*h*. For example, in the glass ceramic layer 11, a ninth electrically insulating layer 11*i* may be laminated on the second main surface 10*d* side of the eighth electrically insulating layer 11*h*.

The constituent material of the ninth electrically insulating layer 11*i* is desirably the same as the constituent materials of the first electrically insulating layer 11*a*, second electrically insulating layer 11*b*, third electrically insulating layer 11*c*, fourth electrically insulating layer 11*d*, fifth electrically insulating layer 11*e*, sixth electrically insulating layer 11*f*, seventh electrically insulating layer 11*g*, and eighth electrically insulating layer 11*h*.

A first coil 31 and a second coil 32 are provided in the element body 10, more specifically, in the glass ceramic layer 11.

The first coil 31 includes a first coil conductor 41*a*, a second coil conductor 41*b*, a third coil conductor 41*c*, and a seventh coil conductor 41*g*.

The first coil conductor 41*a* is provided on the surface of the first electrically insulating layer 11*a*. The first coil conductor 41*a* is provided in a substantially spiral shape. When viewed in the height direction T, the radially outer end is located near the outer edge of the first electrically insulating layer 11*a*, and the radially inner end is located near the center of the first electrically insulating layer 11*a*. The radially outer end of the first coil conductor 41*a* is connected to a first extended electrode 51 extended from the first outer electrode 21. A land 71*a* is located at the radially inner end of the first coil conductor 41*a*.

A via conductor 111*a* that extends through in the height direction T is provided in the first electrically insulating layer 11*a* at a position that overlaps the land 71*a* when viewed in the height direction T.

A land 81*a* is provided on the surface of the first electrically insulating layer 11*a* at a position spaced apart from the land 71*a* near the center of the first electrically insulating layer 11*a* when viewed in the height direction T. A via conductor 121*a* that extends through in the height direction T is provided in the first electrically insulating layer 11*a* at a position that overlaps the land 81*a* when viewed in the height direction T.

The second coil conductor 41*b* is provided on the surface of the second electrically insulating layer 11*b*. The second coil conductor 41*b* is provided in a substantially spiral shape. When viewed in the height direction T, the radially outer end is located near the outer edge of the second electrically insulating layer 11*b*, and the radially inner end is located near the center of the second electrically insulating layer 11*b*. A land 61*b* is located at the radially outer end of the second coil conductor 41*b*. A land 71*b* is located at the radially inner end of the second coil conductor 41*b*.

A via conductor 101*b* that extends through in the height direction T is provided in the second electrically insulating layer 11*b* at a position that overlaps the land 61*b* when viewed in the height direction T.

A land 81*b* is provided on the surface of the second electrically insulating layer 11*b* at a position spaced apart from the land 71*b* near the center of the second electrically insulating layer 11*b* when viewed in the height direction T. A via conductor 121*b* that extends through in the height direction T is provided in the second electrically insulating layer 11*b* at a position that overlaps the land 81*b* when viewed in the height direction T.

The third coil conductor 41*c* is provided on the surface of the third electrically insulating layer 11*c*. The third coil conductor 41*c* is provided in a substantially spiral shape. When viewed in the height direction T, the radially outer end is located near the outer edge of the third electrically insulating layer 11*c*, and the radially inner end is located near the center of the third electrically insulating layer 11*c*. A land 61*c* is located at the radially outer end of the third coil conductor 41*c*. A land 71*c* is located at the radially inner end of the third coil conductor 41*c*.

A via conductor 111*c* that extends through in the height direction T is provided in the third electrically insulating layer 11*c* at a position that overlaps the land 71*c* when viewed in the height direction T.

A land 81*c* is provided on the surface of the third electrically insulating layer 11*c* at a position spaced apart from the land 71*c* near the center of the third electrically insulating layer 11*c* when viewed in the height direction T. A via conductor 121*c* that extends through in the height direction T is provided in the third electrically insulating layer 11*c* at a position that overlaps the land 81*c* when viewed in the height direction T.

The seventh coil conductor 41*g* is provided on the surface of the seventh electrically insulating layer 11*g*. The seventh coil conductor 41*g* is provided in a substantially spiral shape. When viewed in the height direction T, the radially outer end is located near the outer edge of the seventh electrically insulating layer 11*g*, and the radially inner end is located near the center of the seventh electrically insulating layer 11*g*. The radially outer end of the seventh coil conductor 41*g* is connected to a second extended electrode 52 extended from the second outer electrode 22. A land 71*g* is located at the radially inner end of the seventh coil conductor 41*g*.

The second coil 32 includes a fourth coil conductor 41*d*, a fifth coil conductor 41*e*, a sixth coil conductor 41*f*, and an eighth coil conductor 41*h*.

The fourth coil conductor 41*d* is provided on the surface of the fourth electrically insulating layer 11*d*. The fourth coil conductor 41*d* is provided in a substantially spiral shape. When viewed in the height direction T, the radially outer end is located near the outer edge of the fourth electrically insulating layer 11*d*, and the radially inner end is located near the center of the fourth electrically insulating layer 11*d*. The radially outer end of the fourth coil conductor 41*d* is connected to a fourth extended electrode 54 extended from the fourth outer electrode 24. A land 71*d* is located at the radially inner end of the fourth coil conductor 41*d*.

A land 81*d* is provided on the surface of the fourth electrically insulating layer 11*d* at a position spaced apart from the land 71*d* near the center of the fourth electrically insulating layer 11*d* when viewed in the height direction T. A via conductor 121*d* that extends through in the height direction T is provided in the fourth electrically insulating layer 11*d* at a position that overlaps the land 81*d* when viewed in the height direction T.

The fifth coil conductor 41*e* is provided on the surface of the fifth electrically insulating layer 11*e*. The fifth coil conductor 41*e* is provided in a substantially spiral shape. When viewed in the height direction T, the radially outer end is located near the outer edge of the fifth electrically insulating layer 11*e*, and the radially inner end is located near the center of the fifth electrically insulating layer 11*e*. A land 61*e* is located at the radially outer end of the fifth coil conductor 41*e*. A land 71*e* is located at the radially inner end of the fifth coil conductor 41*e*.

A via conductor 111*e* that extends through in the height direction T is provided in the fifth electrically insulating layer 11*e* at a position that overlaps the land 71*e* when viewed in the height direction T.

A land 81*e* is provided on the surface of the fifth electrically insulating layer 11*e* at a position spaced apart from the land 71*e* near the center of the fifth electrically insulating layer 11*e* when viewed in the height direction T. A via conductor 121*e* that extends through in the height direction T is provided in the fifth electrically insulating layer 11*e* at a position that overlaps the land 81*e* when viewed in the height direction T.

The sixth coil conductor 41*f* is provided on the surface of the sixth electrically insulating layer 11*f*. The sixth coil conductor 41*f* is provided in a substantially spiral shape. When viewed in the height direction T, the radially outer end is located near the outer edge of the sixth electrically insulating layer 11*f*, and the radially inner end is located near the center of the sixth electrically insulating layer 11*f*. A land 61*f* is located at the radially outer end of the sixth coil conductor 41*f*. A land 71*f* is located at the radially inner end of the sixth coil conductor 41*f*.

A via conductor 101*f* that extends through in the height direction T is provided in the sixth electrically insulating layer 11*f* at a position that overlaps the land 61*f* when viewed in the height direction T.

A land 81*f* is provided on the surface of the sixth electrically insulating layer 11*f* at a position spaced apart from the land 71*f* near the center of the sixth electrically insulating layer 11*f* when viewed in the height direction T. A via conductor 121*f* that extends through in the height direction T is provided in the sixth electrically insulating layer 11*f* at a position that overlaps the land 81*f* when viewed in the height direction T.

The eighth coil conductor 41*h* is provided on the surface of the eighth electrically insulating layer 11*h*. The eighth coil conductor 41*h* is provided in a substantially spiral shape. When viewed in the height direction T, the radially outer end is located near the outer edge of the eighth electrically insulating layer 11*h*, and the radially inner end is located near the center of the eighth electrically insulating layer 11*h*. The radially outer end of the eighth coil conductor 41*h* is connected to a third extended electrode 53 extended from the third outer electrode 23. A land 71*h* is located at the radially inner end of the eighth coil conductor 41*h*.

A via conductor 111*h* that extends through in the height direction T is provided in the eighth electrically insulating layer 11*h* at a position that overlaps the land 71*h* when viewed in the height direction T.

When viewed in the height direction T, the land 61*b*, the land 61*c*, the land 61*e*, the land 61*f*, the land 71*a*, the land 71*b*, the land 71*c*, the land 71*d*, the land 71*e*, the land 71*f*, the land 71*g*, the land 71*h*, the land 81*a*, the land 81*b*, the land 81*c*, the land 81*d*, the land 81*e*, and the land 81*f* each may have a substantially circular shape as shown in FIG. 2 or may have a substantially polygonal shape.

Examples of the constituent materials of the first coil conductor 41*a*, second coil conductor 41*b*, third coil conductor 41*c*, fourth coil conductor 41*d*, fifth coil conductor 41*e*, sixth coil conductor 41*f*, seventh coil conductor 41*g*, eighth coil conductor 41*h*, first extended electrode 51, second extended electrode 52, third extended electrode 53, fourth extended electrode 54, land 61*b*, land 61*c*, land 61*e*, land 61*f*, land 71*a*, land 71*b*, land 71*c*, land 71*d*, land 71*e*, land 71*f*, land 71*g*, land 71*h*, land 81*a*, land 81*b*, land 81*c*, land 81*d*, land 81*e*, land 81*f*, via conductor 101*b*, via conductor 101*f*, via conductor 111*a*, via conductor 111*c*, via conductor 111*e*, via conductor 111*h*, via conductor 121*a*, via conductor 121*b*, via conductor 121*c*, via conductor 121*d*, via conductor 121*e*, and via conductor 121*f* include Ag, Au, Cu, Pd, Ni, Al, and alloys each containing at least one of these metals.

When the seventh electrically insulating layer 11*g*, the fourth electrically insulating layer 11*d*, the third electrically insulating layer 11*c*, the second electrically insulating layer 11*b*, the fifth electrically insulating layer 11*e*, the sixth electrically insulating layer 11*f*, the first electrically insulating layer 11*a*, and the eighth electrically insulating layer 11*h* are laminated in order in the height direction T, the first coil conductor 41*a*, the second coil conductor 41*b*, the third coil conductor 41*c*, and the seventh coil conductor 41*g* are laminated in the height direction T together with the first electrically insulating layer 11*a*, the second electrically insulating layer 11*b*, the third electrically insulating layer 11*c*, and the seventh electrically insulating layer 11*g* and electrically connected. More specifically, the configuration is as follows.

Initially, the land 71*g* of the seventh coil conductor 41*g* is electrically connected to the land 71*c* of the third coil conductor 41*c* via the via conductor 121*d*, the land 81*d*, and the via conductor 111*c* sequentially. The via conductor 121*d* and the via conductor 111*c* are provided at a position that overlaps the radially inner ends of the third coil conductor 41*c* and seventh coil conductor 41*g* when viewed in the height direction T, that is, a position that overlaps the land 71*c* and the land 71*g* when viewed in the height direction T. The via conductor 121*d* and the via conductor 111*c* are components of a first inner via conductor 202*a*. Therefore, in other words, the third coil conductor 41*c* and the seventh coil conductor 41*g* are electrically connected via the first inner via conductor 202*a*, more specifically, via the first inner via conductor 202*a* and the land 81*d*.

Subsequently, the land 61*c* of the third coil conductor 41*c* is electrically connected to the land 61*b* of the second coil conductor 41*b* via the via conductor 101*b*. The via conductor 101*b* is provided at a position that overlaps the radially outer ends of the second coil conductor 41*b* and third coil conductor 41*c* when viewed in the height direction T, that is, a position that overlaps the land 61*b* and the land 61*c* when viewed in the height direction T. The via conductor 101*b* is a component of a first outer via conductor 201*a*. Therefore, in other words, the second coil conductor 41*b* and the third coil conductor 41*c* are electrically connected via the first outer via conductor 201*a*.

Subsequently, the land 71*b* of the second coil conductor 41*b* is electrically connected to the land 71*a* of the first coil conductor 41*a* via the via conductor 121*e*, the land 81*e*, the via conductor 121*f*, the land 81*f*, and the via conductor 111*a* sequentially. The via conductor 121*e*, the via conductor 121*f*, and the via conductor 111*a* are provided at positions that overlap the radially inner ends of the first coil conductor 41*a* and second coil conductor 41*b* when viewed in the height direction T, that is, positions that overlap the land 71*a* and the land 71*b* when viewed in the height direction T. The via conductor 121*e*, the via conductor 121*f*, and the via conductor 111*a* are components of a second inner via conductor 202*b*. Therefore, in other words, the first coil conductor 41*a* and the second coil conductor 41*b* are electrically connected via the second inner via conductor 202*b*, more specifically, via the second inner via conductor 202*b*, the land 81*e*, and the land 81*f*.

As described above, the first coil 31 is formed by electrically connecting the first coil conductor 41*a*, the second coil conductor 41*b*, the third coil conductor 41*c*, and the seventh coil conductor 41*g*.

As shown in FIG. 2 and FIG. 6, one end of the first coil 31, more specifically, the radially outer end of the first coil conductor 41*a*, is electrically connected to the first outer electrode 21 via the first extended electrode 51.

As shown in FIG. 2 and FIG. 6, the other end of the first coil 31, more specifically, the radially outer end of the seventh coil conductor 41*g*, is electrically connected to the second outer electrode 22 via the second extended electrode 52.

When the seventh electrically insulating layer 11*g*, the fourth electrically insulating layer 11*d*, the third electrically insulating layer 11*c*, the second electrically insulating layer 11*b*, the fifth electrically insulating layer 11*e*, the sixth electrically insulating layer 11*f*, the first electrically insulating layer 11*a*, and the eighth electrically insulating layer 11*h* are laminated in order in the height direction T, the fourth coil conductor 41*d*, the fifth coil conductor 41*e*, the sixth coil conductor 41*f*, and the eighth coil conductor 41*h* are laminated in the height direction T together with the fourth electrically insulating layer 11*d*, the fifth electrically insulating layer 11*e*, the sixth electrically insulating layer 11*f*, and the eighth electrically insulating layer 11*h* and electrically connected. More specifically, the configuration is as follows.

Initially, the land 71*d* of the fourth coil conductor 41*d* is electrically connected to the land 71*e* of the fifth coil conductor 41*e* via the via conductor 121*c*, the land 81*c*, the via conductor 121*b*, the land 81*b*, and the via conductor 111*e* sequentially. The via conductor 121*c*, the via conductor 121*b*, and the via conductor 111*e* are provided at positions that overlap the radially inner ends of the fourth coil conductor 41*d* and fifth coil conductor 41*e* when viewed in the height direction T, that is, positions that overlap the land 71*d* and the land 71*e* when viewed in the height direction T. The via conductor 121*c*, the via conductor 121*b*, and the via conductor 111*e* are components of a third inner via conductor 202*c*. Therefore, in other words, the fourth coil conductor 41*d* and the fifth coil conductor 41*e* are electrically connected via the third inner via conductor 202*c*, more specifically, via the third inner via conductor 202*c*, the land 81*c*, and the land 81*b*.

Subsequently, the land 61*e* of the fifth coil conductor 41*e* is electrically connected to the land 61*f* of the sixth coil conductor 41*f* via the via conductor 101*f*. The via conductor 101*f* is provided at a position that overlaps the radially outer ends of the fifth coil conductor 41*e* and sixth coil conductor 41*f* when viewed in the height direction T, that is, a position that overlaps the land 61*e* and the land 61*f* when viewed in the height direction T. The via conductor 101*f* is a component of a second outer via conductor 201*b*. Therefore, in other words, the fifth coil conductor 41*e* and the sixth coil conductor 41*f* are electrically connected via the second outer via conductor 201*b*.

Subsequently, the land 71*f* of the sixth coil conductor 41*f* is electrically connected to the land 71*h* of the eighth coil conductor 41*h* via the via conductor 121*a*, the land 81*a*, and the via conductor 111*h* sequentially. The via conductor 121*a* and the via conductor 111*h* are provided at positions that overlap the radially inner ends of the sixth coil conductor 41*f* and eighth coil conductor 41*h* when viewed in the height direction T, that is, positions that overlap the land 71*f* and the land 71*h* when viewed in the height direction T. The via conductor 121*a* and the via conductor 111*h* are components of a fourth inner via conductor 202*d*. Therefore, in other words, the sixth coil conductor 41*f* and the eighth coil conductor 41*h* are electrically connected via the fourth inner via conductor 202*d*, more specifically, via the fourth inner via conductor 202*d* and the land 81*a*.

As described above, the second coil 32 is formed by electrically connecting the fourth coil conductor 41*d*, the fifth coil conductor 41*e*, the sixth coil conductor 41*f*, and the eighth coil conductor 41*h*. The second coil 32 is electrically insulated from the first coil 31.

As shown in FIG. 2 and FIG. 7, one end of the second coil 32, more specifically, the radially outer end of the eighth coil conductor 41*h*, is electrically connected to the third outer electrode 23 via the third extended electrode 53.

As shown in FIG. 2 and FIG. 7, the other end of the second coil 32, more specifically, the radially outer end of the fourth coil conductor 41*d*, is electrically connected to the fourth outer electrode 24 via the fourth extended electrode 54.

The coil axis of each of the first coil 31 and the second coil 32 passes through the center of gravity of the shape of the coil when viewed in the height direction T and extends in the height direction T.

When viewed in the height direction T, the outer shape of each of the first coil 31 and the second coil 32 may be a shape made up of straight lines and curves as shown in FIG. 2, may be a substantially circular shape, or may be a substantially polygonal shape.

In the common mode choke coil 1, the seventh electrically insulating layer 11*g*, the fourth electrically insulating layer 11*d*, the third electrically insulating layer 11*c*, the second electrically insulating layer 11*b*, the fifth electrically insulating layer 11*e*, the sixth electrically insulating layer 11*f*, the first electrically insulating layer 11*a*, and the eighth electrically insulating layer 11*h*, each having the conductor portions including the above-described coil conductor and the like, are laminated in order in the height direction T, and, when laminated in such order, a common mode attenuation Scc21 that is an index of noise reduction performance tends to increase.

In the common mode choke coil 1, a first dummy conductor 300*a* is further provided on the surface of at least one of the electrically insulating layers, consisting of the first electrically insulating layer 11*a*, the fourth electrically insulating layer 11*d*, the fifth electrically insulating layer 11*e*, and the sixth electrically insulating layer 11*f*, provided at a position other than between the second electrically insulating layer 11*b* and the third electrically insulating layer 11*c*. The first dummy conductors 300*a* overlap the first outer via conductor 201*a* (via conductor 101*b*) when viewed in the height direction T and are electrically insulated from all the coil conductors. Thus, in a state where the plurality of electrically insulating layers each having the conductor portions including the coil conductor and the like is laminated, an area located in the height direction T with respect to a connection portion S1 (see FIG. 4) where the land 61*b* of the second coil conductor 41*b*, the first outer via conductor 201*a*, and the land 61*c* of the third coil conductor 41*c* overlap is packed closely by the amount of the first dummy conductor 300*a*. For this reason, when the obtained laminated body is pressure bonded, a pressure in the height direction T tends to be applied to the connection portion S1. As a result, the connectivity between the land 61*b* of the second coil conductor 41*b* and the first outer via conductor 201*a* is excellent, and the connectivity between the land 61*c* of the third coil conductor 41*c* and the first outer via conductor 201*a* is excellent. In other words, a break of the first coil 31 is reduced.

Each of the first dummy conductors 300*a* desirably overlaps the entire first outer via conductor 201*a* when viewed in the height direction T and may overlap part of the first outer via conductor 201*a*.

A mode of arrangement of the first dummy conductors 300*a* includes the following first mode, second mode, third mode, and fourth mode.

First Mode

All of the electrically insulating layers consisting of the first electrically insulating layer 11*a*, the fourth electrically insulating layer 11*d*, the fifth electrically insulating layer 11*e*, and the sixth electrically insulating layer 11*f* are provided at positions other than between the second electrically insulating layer 11*b* and the third electrically insulating layer 11*c*, and the first dummy conductors 300*a* are respectively provided on the surfaces of the first electrically insulating layer 11*a*, fourth electrically insulating layer 11*d*, fifth electrically insulating layer 11*e*, and sixth electrically insulating layer 11*f*. The first mode is shown in FIG. 2 and FIG. 4 and is a preferred mode. In the first mode, as compared to the second mode (described later), a greater number of the first dummy conductors 300*a* are provided, so, when the plurality of electrically insulating layers each having the conductor portions including the coil conductor and the like is laminated and then pressure bonded, a pressure in the height direction T is more easily applied to the connection portion S1. As a result, the connectivity between the land 61*b* of the second coil conductor 41*b* and the first outer via conductor 201*a* is excellent, and the connectivity between the land 61*c* of the third coil conductor 41*c* and the first outer via conductor 201*a* is excellent.

Second Mode

All of the electrically insulating layers consisting of the first electrically insulating layer 11*a*, the fourth electrically insulating layer 11*d*, the fifth electrically insulating layer 11*e*, and the sixth electrically insulating layer 11*f* are provided at positions other than between the second electrically insulating layer 11*b* and the third electrically insulating layer 11*c*, and the first dummy conductors 300*a* is provided on the surface of each of one or some of the first electrically insulating layer 11*a*, fourth electrically insulating layer 11*d*, fifth electrically insulating layer 11*e*, and sixth electrically insulating layer 11*f*. As a second mode, for example, the first electrically insulating layer 11*a*, the fourth electrically insulating layer 11*d*, the fifth electrically insulating layer 11*e*, and the sixth electrically insulating layer 11*f* are provided at positions other than between the second electrically insulating layer 11*b* and the third electrically insulating layer 11*c*, and the first dummy conductors 300*a* are respectively provided on the surfaces of the fourth electrically insulating layer 11*d* and fifth electrically insulating layer 11*e*.

Third Mode

One or some of the electrically insulating layers consisting of the first electrically insulating layer 11*a*, the fourth electrically insulating layer 11*d*, the fifth electrically insulating layer 11*e*, and the sixth electrically insulating layer 11*f* are provided at a position or positions other than between the second electrically insulating layer 11*b* and the third electrically insulating layer 11*c*, and the first dummy conductor 300*a* is provided on the surface of each of the one or some of the electrically insulating layers. As a third mode, for example, in FIG. 2, in a state where the second electrically insulating layer 11*b* and the fifth electrically insulating layer 11*e* are interchanged, that is, in a state where the first electrically insulating layer 11*a*, the fourth electrically insulating layer 11*d*, and the sixth electrically insulating layer 11*f* are provided at positions other than between the second electrically insulating layer 11*b* and the third electrically insulating layer 11*c*, the first dummy conductors 300*a* are respectively provided on the surfaces of the first electrically insulating layer 11*a*, fourth electrically insulating layer 11*d*, and sixth electrically insulating layer 11*f*. In this case, the fifth electrically insulating layer 11*e* is provided at a position between the second electrically insulating layer 11*b* and the third electrically insulating layer 11*c*; however, a via conductor that extends through in the height direction T and that is part of the first outer via conductor 201*a* is provided in the fifth electrically insulating layer 11*e*.

Fourth Mode

One or some of the electrically insulating layers consisting of the first electrically insulating layer 11*a*, the fourth electrically insulating layer 11*d*, the fifth electrically insulating layer 11*e*, and the sixth electrically insulating layer 11*f* are provided at a position or positions other than between the second electrically insulating layer 11*b* and the third electrically insulating layer 11*c*, and the first dummy conductor 300*a* is provided on the surface of each of further one or some of the above-described one or some of the electrically insulating layers. As a fourth mode, for example, in FIG. 2, in a state where the second electrically insulating layer 11*b* and the fifth electrically insulating layer 11*e* are interchanged, that is, in a state where the first electrically insulating layer 11*a*, the fourth electrically insulating layer 11*d*, and the sixth electrically insulating layer 11*f* are provided at positions other than between the second electrically insulating layer 11*b* and the third electrically insulating layer 11*c*, the first dummy conductors 300*a* are respectively provided on the surfaces of the fourth electrically insulating layer 11*d* and sixth electrically insulating layer 11*f*.

The first dummy conductor 300*a* may be provided on the surface of one of the electrically insulating layers, consisting of the first electrically insulating layer 11*a*, the fourth electrically insulating layer 11*d*, the fifth electrically insulating layer 11*e*, and the sixth electrically insulating layer 11*f*, located in an area across the second electrically insulating layer 11*b* from the third electrically insulating layer 11*c*. In this case, the first dummy conductor 300*a* is desirably provided on the surface of the electrically insulating layer next to the second electrically insulating layer 11*b*, and, in FIG. 2, desirably provided on the surface of the fifth electrically insulating layer 11*e*. Thus, when the plurality of electrically insulating layers each having the conductor portions including the coil conductor and the like is laminated and then pressure bonded, a pressure in the height direction T is more easily applied to the connection portion S1. As a result, the connectivity between the land 61*b* of the second coil conductor 41*b* and the first outer via conductor 201*a* is excellent, and the connectivity between the land 61*c* of the third coil conductor 41*c* and the first outer via conductor 201*a* is excellent.

The first dummy conductor 300*a* may be provided on the surface of one of the electrically insulating layers, consisting of the first electrically insulating layer 11*a*, the fourth electrically insulating layer 11*d*, the fifth electrically insulating layer 11*e*, and the sixth electrically insulating layer 11*f*, located in an area across the third electrically insulating layer 11*c* from the second electrically insulating layer 11*b*. In this case, the first dummy conductor 300*a* is desirably provided on the surface of the electrically insulating layer next to the third electrically insulating layer 11*c*, and, in FIG. 2, desirably provided on the surface of the fourth electrically insulating layer 11*d*. Thus, when the plurality of electrically insulating layers each having the conductor portions including the coil conductor and the like is laminated and then pressure bonded, a pressure in the height direction T is more easily applied to the connection portion S1. As a result, the connectivity between the land 61*b* of the second coil conductor 41*b* and the first outer via conductor 201*a* is excellent, and the connectivity between the land 61*c* of the third coil conductor 41*c* and the first outer via conductor 201*a* is excellent.

The first dummy conductor 300*a* may be provided on the surface of one of the electrically insulating layers, consisting of the first electrically insulating layer 11*a*, the fourth electrically insulating layer 11*d*, the fifth electrically insulating layer 11*e*, and the sixth electrically insulating layer 11*f*, located in an area across the second electrically insulating layer 11*b* from the third electrically insulating layer 11*c* and on the surface of one of the electrically insulating layers, consisting of the first electrically insulating layer 11*a*, the fourth electrically insulating layer 11*d*, the fifth electrically insulating layer 11*e*, and the sixth electrically insulating layer 11*f*, located in an area across the third electrically insulating layer 11*c* from the second electrically insulating layer 11*b*. In this case, the first dummy conductors 300*a* are desirably respectively provided on the surface of the electrically insulating layer next to the second electrically insulating layer 11*b*, that is, the surface of the fifth electrically insulating layer 11*e* in FIG. 2, and on the surface of the electrically insulating layer next to the third electrically insulating layer 11*c*, that is, the surface of the fourth electrically insulating layer 11*d* in FIG. 2. Thus, when the plurality of electrically insulating layers each having the conductor portions including the coil conductor and the like is laminated and then pressure bonded, a pressure in the height direction T is more easily applied to the connection portion S1. As a result, the connectivity between the land 61*b* of the second coil conductor 41*b* and the first outer via conductor 201*a* is excellent, and the connectivity between the land 61*c* of the third coil conductor 41*c* and the first outer via conductor 201*a* is excellent.

When the mode of arrangement of the first dummy conductors 300*a* is the first mode, second dummy conductors 300*b* are desirably respectively further provided on the surfaces of the first electrically insulating layer 11*a*, second electrically insulating layer 11*b*, third electrically insulating layer 11*c*, fourth electrically insulating layer 11*d*, fifth electrically insulating layer 11*e*, and sixth electrically insulating layer 11*f*. Where a straight line Q that passes through a center P of the electrically insulating layers when viewed in the height direction T and that extends in the long-side direction of the electrically insulating layers is defined, each of the second dummy conductors 300_b_ is desirably symmetric with the first outer via conductor 201_a_ with respect to the straight line Q and electrically insulated from all the coil conductors. In this case, in other words, when viewed in the height direction T, the first dummy conductors 300_a_ and the second dummy conductors 300_b_ are symmetric with respect to the straight line Q. In other words, the second dummy conductors 300_b_ are provided in an area AR2 (see FIG. 5) symmetric with an area AR1 in which the connection portion S1 and the first dummy conductors 300_a_ are provided.

When the first dummy conductors 300_a_ are respectively provided on the surfaces of the first electrically insulating layer 11_a_, fourth electrically insulating layer 11_d_, fifth electrically insulating layer 11_e_, and sixth electrically insulating layer 11_f_ as in the case of the first mode, the length of the element body 10 in the height direction T increases in the area AR1 additionally due to the presence of the first outer via conductor 201_a_, so there are concerns that the common mode choke coil 1 locally deforms. Such a deformation in the area AR1 tends to influence a part relatively closer to the area AR1. In contrast, when the second dummy conductors 300_b_ are provided in the area AR2 located relatively closer to the area AR1, the length of the area AR2 in the height direction T increases and tends to match the length of the area AR1 in the height direction T. Thus, the influence of a deformation in the area AR1 is eased, so a deformation of the common mode choke coil 1 is suppressed.

In FIG. 2, the center P and the straight line Q are shown on the first electrically insulating layer 11_a_ as a representative of the electrically insulating layers, and the center P and the straight line Q are also present at the same positions in the other electrically insulating layers.

In FIG. 2, the long-side direction of the electrically insulating layers corresponds to the length direction L, and the short-side direction of the electrically insulating layers corresponds to the width direction W. When viewed in the height direction T, the long-side direction of the electrically insulating layers may correspond to the width direction W, and the short-side direction of the electrically insulating layers may correspond to the length direction L. When the electrically insulating layer has a substantially square shape when viewed in the height direction T, the long-side direction and short-side direction of the electrically insulating layer are not distinguished from each other.

The second dummy conductors 300_b_ may be respectively provided on the surfaces of the first electrically insulating layer 11_a_, second electrically insulating layer 11_b_, third electrically insulating layer 11_c_, fourth electrically insulating layer 11_d_, fifth electrically insulating layer 11_e_, and sixth electrically insulating layer 11_f_, or the second dummy conductor 300_b_ may be provided on the surface of each of one or some of the electrically insulating layers consisting of the first electrically insulating layer 11_a_, the second electrically insulating layer 11_b_, the third electrically insulating layer 11_c_, the fourth electrically insulating layer 11_d_, the fifth electrically insulating layer 11_e_, and the sixth electrically insulating layer 11_f_.

In the common mode choke coil 1, a third dummy conductor 300_c_ is desirably further provided on the surface of at least one of the electrically insulating layers, consisting of the first electrically insulating layer 11_a_, the second electrically insulating layer 11_b_, the third electrically insulating layer 11_c_, and the fourth electrically insulating layer 11_d_, provided at a position other than between the fifth electrically insulating layer 11_e_ and the sixth electrically insulating layer 11_f_. The third dummy conductor 300_c_ overlaps the second outer via conductor 201_b_ (via conductor 101_f_) when viewed in the height direction T and is electrically insulated from all the coil conductors. Thus, in a state where the plurality of electrically insulating layers each having the conductor portions including the coil conductor and the like is laminated, an area located in the height direction T with respect to a connection portion S2 (see FIG. 5) where the land 61_e_ of the fifth coil conductor 41_e_, the second outer via conductor 201_b_, and the land 61_f_ of the sixth coil conductor 41_f_ overlap is packed closely by the amount of the third dummy conductor 300_c_. For this reason, when the obtained laminated body is pressure bonded, a pressure in the height direction T tends to be applied to the connection portion S2. As a result, the connectivity between the land 61_e_ of the fifth coil conductor 41_e_ and the second outer via conductor 201_b_ is excellent, and the connectivity between the land 61_f_ of the sixth coil conductor 41_f_ and the second outer via conductor 201_b_ is excellent. In other words, a break of the second coil 32 is reduced.

Each of the third dummy conductors 300_c_ desirably overlaps the entire second outer via conductor 201_b_ when viewed in the height direction T and may overlap part of the second outer via conductor 201_b_.

A mode of arrangement of the third dummy conductors 300_c_ includes the following fifth mode, sixth mode, seventh mode, and eighth mode.

Fifth Mode

All of the electrically insulating layers consisting of the first electrically insulating layer 11_a_, the second electrically insulating layer 11_b_, the third electrically insulating layer 11_c_, and the fourth electrically insulating layer 11_d_ are provided at positions other than between the fifth electrically insulating layer 11_e_ and the sixth electrically insulating layer 11_f_, and the third dummy conductors 300_c_ are respectively provided on the surfaces of the first electrically insulating layer 11_a_, second electrically insulating layer 11_b_, third electrically insulating layer 11_c_, and fourth electrically insulating layer 11_d_. The fifth mode is shown in FIG. 2 and FIG. 5 and is a preferred mode. In the fifth mode, as compared to the sixth mode (described later), a greater number of the third dummy conductors 300_c_ are provided, so, when the plurality of electrically insulating layers each having the conductor portions including the coil conductor and the like is laminated and then pressure bonded, a pressure in the height direction T is more easily applied to the connection portion S2. As a result, the connectivity between the land 61_e_ of the fifth coil conductor 41_e_ and the second outer via conductor 201_b_ is excellent, and the connectivity between the land 61_f_ of the sixth coil conductor 41_f_ and the second outer via conductor 201_b_ is excellent.

Sixth Mode

All of the electrically insulating layers consisting of the first electrically insulating layer 11_a_, the second electrically insulating layer 11_b_, the third electrically insulating layer 11_c_, and the fourth electrically insulating layer 11_d_ are provided at positions other than between the fifth electrically insulating layer 11_e_ and the sixth electrically insulating layer 11_f_, and the third dummy conductor 300_c_ is provided on the surface of each of one or some of the first electrically insulating layer 11_a_, second electrically insulating layer 11_b_, third electrically insulating layer 11_c_, and fourth electrically insulating layer 11_d_. As a sixth mode, for example, the first electrically insulating layer 11_a_, the second electrically insulating layer 11_b_, the third electrically insulating layer 11_c_, and the fourth electrically insulating layer 11_d_ are provided at positions other than between the fifth electrically insulating layer 11*e* and the sixth electrically insulating layer 11*f*, and the third dummy conductors 300*c* are respectively provided on the surfaces of the first electrically insulating layer 11*a* and second electrically insulating layer 11*b*.

Seventh Mode

One or some of the electrically insulating layers consisting of the first electrically insulating layer 11*a*, the second electrically insulating layer 11*b*, the third electrically insulating layer 11*c*, and the fourth electrically insulating layer 11*d* are provided at a position or positions other than between the fifth electrically insulating layer 11*e* and the sixth electrically insulating layer 11*f*, and the third dummy conductor 300*c* is provided on the surface of each of the one or some of the electrically insulating layers. As a seventh mode, for example, in FIG. 2, in a state where the second electrically insulating layer 11*b* and the fifth electrically insulating layer 11*e* are interchanged, that is, in a state where the first electrically insulating layer 11*a*, the third electrically insulating layer 11*c*, and the fourth electrically insulating layer 11*d* are provided at positions other than between the fifth electrically insulating layer 11*e* and the sixth electrically insulating layer 11*f*, the third dummy conductors 300*c* are respectively provided on the surfaces of the first electrically insulating layer 11*a*, the third electrically insulating layer 11*c*, and the fourth electrically insulating layer 11*d*. In this case, the second electrically insulating layer 11*b* is provided at a position between the fifth electrically insulating layer 11*e* and the sixth electrically insulating layer 11*f*; however, a via conductor that extends through in the height direction T and that is part of the second outer via conductor 201*b* is provided in the second electrically insulating layer 11*b*.

Eighth Mode

One or some of the electrically insulating layers consisting of the first electrically insulating layer 11*a*, the second electrically insulating layer 11*b*, the third electrically insulating layer 11*c*, and the fourth electrically insulating layer 11*d* are provided at positions other than between the fifth electrically insulating layer 11*e* and the sixth electrically insulating layer 11*f*, and the third dummy conductor 300*c* is provided on the surface of each of further one or some of the above-described one or some of the electrically insulating layers. As an eighth mode, for example, in FIG. 2, in a state where the second electrically insulating layer 11*b* and the fifth electrically insulating layer 11*e* are interchanged, that is, in a state where the first electrically insulating layer 11*a*, the third electrically insulating layer 11*c*, and the fourth electrically insulating layer 11*d* are provided at positions other than between the fifth electrically insulating layer 11*e* and the sixth electrically insulating layer 11*f*, the third dummy conductors 300*c* are respectively provided on the surfaces of the first electrically insulating layer 11*a* and third electrically insulating layer 11*c*.

The third dummy conductor 300*c* may be provided on one of the surfaces of the electrically insulating layers, consisting of the first electrically insulating layer 11*a*, the second electrically insulating layer 11*b*, the third electrically insulating layer 11*c*, and the fourth electrically insulating layer 11*d*, located in an area across the fifth electrically insulating layer 11*e* from the sixth electrically insulating layer 11*f*. In this case, the third dummy conductor 300*c* is desirably provided on the surface of the electrically insulating layer next to the fifth electrically insulating layer 11*e*, and, in FIG. 2, desirably provided on the surface of the second electrically insulating layer 11*b*. Thus, when the plurality of electrically insulating layers each having the conductor portions including the coil conductor and the like is laminated and then pressure bonded, a pressure in the height direction T is more easily applied to the connection portion S2. As a result, the connectivity between the land 61*e* of the fifth coil conductor 41*e* and the second outer via conductor 201*b* is excellent, and the connectivity between the land 61*f* of the sixth coil conductor 41*f* and the second outer via conductor 201*b* is excellent.

The third dummy conductor 300*c* may be provided on one of the surfaces of the electrically insulating layers, consisting of the first electrically insulating layer 11*a*, the second electrically insulating layer 11*b*, the third electrically insulating layer 11*c*, and the fourth electrically insulating layer 11*d*, located in an area across the sixth electrically insulating layer 11*f* from the fifth electrically insulating layer 11*e*. In this case, the third dummy conductor 300*c* is desirably provided on the surface of the electrically insulating layer next to the sixth electrically insulating layer 11*f*, and, in FIG. 2, desirably provided on the surface of the first electrically insulating layer 11*a*. Thus, when the plurality of electrically insulating layers each having the conductor portions including the coil conductor and the like is laminated and then pressure bonded, a pressure in the height direction T is more easily applied to the connection portion S2. As a result, the connectivity between the land 61*e* of the fifth coil conductor 41*e* and the second outer via conductor 201*b* is excellent, and the connectivity between the land 61*f* of the sixth coil conductor 41*f* and the second outer via conductor 201*b* is excellent.

The third dummy conductors 300*c* may be provided on the surface of one of the electrically insulating layers, consisting of the first electrically insulating layer 11*a*, the second electrically insulating layer 11*b*, the third electrically insulating layer 11*c*, and the fourth electrically insulating layer 11*d*, located in an area across the fifth electrically insulating layer 11*e* from the sixth electrically insulating layer 11*f* and on the surface of one of the electrically insulating layers, consisting of the first electrically insulating layer 11*a*, the second electrically insulating layer 11*b*, the third electrically insulating layer 11*c*, and the fourth electrically insulating layer 11*d*, located in an area across the sixth electrically insulating layer 11*f* from the fifth electrically insulating layer 11*e*. In this case, the third dummy conductors 300*c* are desirably respectively provided on the surface of the electrically insulating layer next to the fifth electrically insulating layer 11*e*, that is, the surface of the second electrically insulating layer 11*b* in FIG. 2, and on the surface of the electrically insulating layer next to the sixth electrically insulating layer 11*f*, that is, the surface of the first electrically insulating layer 11*a* in FIG. 2. Thus, when the plurality of electrically insulating layers each having the conductor portions including the coil conductor and the like is laminated and then pressure bonded, a pressure in the height direction T is more easily applied to the connection portion S2. As a result, the connectivity between the land 61*e* of the fifth coil conductor 41*e* and the second outer via conductor 201*b* is excellent, and the connectivity between the land 61*f* of the sixth coil conductor 41*f* and the second outer via conductor 201*b* is excellent.

When the mode of arrangement of the third dummy conductors 300*c* is the fifth mode, fourth dummy conductors 300*d* are desirably respectively further provided on the surfaces of the first electrically insulating layer 11*a*, the second electrically insulating layer 11*b*, the third electrically insulating layer 11*c*, the fourth electrically insulating layer 11*d*, the fifth electrically insulating layer 11*e*, and the sixth electrically insulating layer 11*f*. Where a straight line Q that passes through a center P of the electrically insulating layers when viewed in the height direction T and that extends in the long-side direction of the electrically insulating layers is defined, each of the fourth dummy conductors 300*d* is desirably symmetric with the second outer via conductor 201*b* with respect to the straight line Q and electrically insulated from all the coil conductors. In this case, in other words, when viewed in the height direction T, the third dummy conductors 300*c* and the fourth dummy conductors 300*d* are symmetric with respect to the straight line Q. In other words, the fourth dummy conductors 300*d* are provided in an area AR4 (see FIG. 4) symmetric with an area AR3 in which the connection portion S2 and the third dummy conductors 300*c* are provided.

When the third dummy conductors 300*c* are respectively provided on the surfaces of the first electrically insulating layer 11*a*, second electrically insulating layer 11*b*, third electrically insulating layer 11*c*, and fourth electrically insulating layer 11*d* as in the case of the fifth mode, the length of the element body 10 in the height direction T increases in the area AR3 additionally due to the presence of the second outer via conductor 201*b*, so there are concerns that the common mode choke coil 1 locally deforms. Such a deformation in the area AR3 tends to influence a part relatively closer to the area AR3. In contrast, when the fourth dummy conductors 300*d* are provided in the area AR4 located relatively closer to the area AR3, the length of the area AR4 in the height direction T increases and tends to match the length of the area AR3 in the height direction T. Thus, the influence of a deformation in the area AR3 is eased, so a deformation of the common mode choke coil 1 is suppressed.

The fourth dummy conductors 300*d* may be respectively provided on the surfaces of the first electrically insulating layer 11*a*, second electrically insulating layer 11*b*, third electrically insulating layer 11*c*, fourth electrically insulating layer 11*d*, fifth electrically insulating layer 11*e*, and sixth electrically insulating layer 11*f*, or the fourth dummy conductor 300*d* may be provided on the surface of each of one or some of the electrically insulating layers consisting of the first electrically insulating layer 11*a*, the second electrically insulating layer 11*b*, the third electrically insulating layer 11*c*, the fourth electrically insulating layer 11*d*, the fifth electrically insulating layer 11*e*, and the sixth electrically insulating layer 11*f*.

When viewed in the height direction T, the first outer via conductor 201*a* and the second outer via conductor 201*b* are desirably symmetric with respect to the center P of the electrically insulating layers. In this case, the influence of a deformation in the area AR1 and the influence of a deformation in the area AR3 effectively cancel out, so a deformation of the common mode choke coil 1 is suppressed. In the common mode choke coil 1, when the area AR2 in which the second dummy conductors 300*b* are provided and the area AR4 in which the fourth dummy conductors 300*d* are provided are present in addition to the area AR1 and the area AR3, these four areas are equally located with respect to the center P of the electrically insulating layers when viewed in the height direction T, so a deformation of the common mode choke coil 1 is further suppressed.

When viewed in the height direction T, the first outer via conductor 201*a* and the second outer via conductor 201*b* desirably do not overlap each other; however, the first outer via conductor 201*a* and the second outer via conductor 201*b* may overlap partially or totally each other.

None of the first dummy conductor 300*a*, the second dummy conductor 300*b*, the third dummy conductor 300*c*, and the fourth dummy conductor 300*d* may be provided on the surface of the seventh electrically insulating layer 11*g*, or at least one of the first dummy conductor 300*a*, the second dummy conductor 300*b*, the third dummy conductor 300*c*, and the fourth dummy conductor 300*d* may be provided on the surface of the seventh electrically insulating layer 11*g*.

None of the first dummy conductor 300*a*, the second dummy conductor 300*b*, the third dummy conductor 300*c*, and the fourth dummy conductor 300*d* may be provided on the surface of the eighth electrically insulating layer 11*h*, or at least one of the first dummy conductor 300*a*, the second dummy conductor 300*b*, the third dummy conductor 300*c*, and the fourth dummy conductor 300*d* may be provided on the surface of the eighth electrically insulating layer 11*h*.

Examples of the constituent materials of the first dummy conductor 300*a*, the second dummy conductor 300*b*, the third dummy conductor 300*c*, and the fourth dummy conductor 300*d* include Ag, Au, Cu, Pd, Ni, Al, and alloys each containing at least one of these metals.

The constituent materials of the first dummy conductor 300*a*, second dummy conductor 300*b*, third dummy conductor 300*c*, and fourth dummy conductor 300*d* are desirably the same as one another. In this case, the constituent material of each of the first dummy conductor 300*a*, the second dummy conductor 300*b*, the third dummy conductor 300*c*, and the fourth dummy conductor 300*d* is more desirably the same as the constituent material of the conductor portion including the coil conductor and the like, provided on the surface of the same electrically insulating layer. Thus, the conductor portion including the coil conductor and the like and the dummy conductor can be formed on the surface of the same electrically insulating layer at the same timing, so manufacturing efficiency improves.

In the common mode choke coil 1, the first coil 31 is made up of four coil conductors, that is, the first coil conductor 41*a*, the second coil conductor 41*b*, the third coil conductor 41*c*, and the seventh coil conductor 41*g*. Alternatively, the first coil 31 may be made up of three coil conductors respectively provided on the surfaces of three electrically insulating layers or may be made up of five or more coil conductors respectively provided on the surfaces of five or more electrically insulating layers.

In the common mode choke coil 1, the second coil 32 is made up of four coil conductors, that is, the fourth coil conductor 41*d*, the fifth coil conductor 41*e*, the sixth coil conductor 41*f*, and the eighth coil conductor 41*h*. Alternatively, the second coil 32 may be made up of three coil conductors respectively provided on the surfaces of three electrically insulating layers or may be made up of five or more coil conductors respectively provided on the surfaces of five or more electrically insulating layers.

In the common mode choke coil 1, the element body 10 is made up of the ferrite layer 12, the glass ceramic layer 11, and the ferrite layer 13. Alternatively, the element body 10 may be made up of only the glass ceramic layer 11 or may have another configuration illustrated below.

Figure 8:
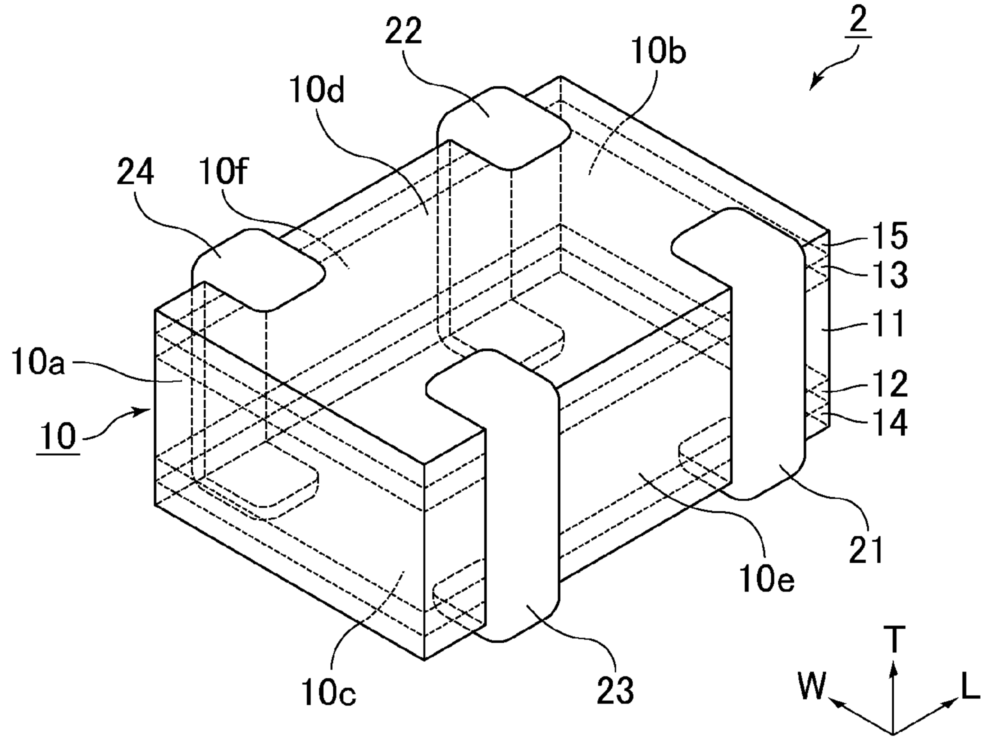
FIG. 8 is a schematic perspective view showing another example of the common mode choke coil according to the preferred embodiments of the present disclosure.

FIG. 8 is a schematic perspective view showing another example of a common mode choke coil according to the preferred embodiments of the present disclosure.

As shown in FIG. 8, in a common mode choke coil 2, an element body 10 has a glass ceramic layer 14, a ferrite layer 12, a glass ceramic layer 11, a ferrite layer 13, and a glass ceramic layer 15 in order from a first main surface 10*c* toward a second main surface 10*d*. Thus, in the element body 10, structural defects, such as peeling between the glass ceramic layer 11 and the ferrite layer 12 and peeling between the glass ceramic layer 11 and the ferrite layer 13, are suppressed.

The glass ceramic layer 14 and the glass ceramic layer 15 each may have a single layer structure or may have a multilayer structure.

A glass ceramic material of each of the glass ceramic layer 14 and the glass ceramic layer 15 is desirably the same as the glass ceramic material of the glass ceramic layer 11.

Manufacturing Method for Common Mode Choke Coil

The common mode choke coil according to the preferred embodiments of the present disclosure is manufactured by, for example, the following method.

Preparation of Glass Ceramic Material

Initially, $K_2O$, $B_2O_3$, $SiO_2$, and $Al_2O_3$ are weighed at a predetermined ratio and mixed. Subsequently, the obtained mixture is fired to melt. After that, the obtained melt is rapidly cooled to prepare a glass material.

A composition of the glass material is desirably higher than or equal to about 0.5 weight percent and lower than or equal to about 5 weight percent (i.e., from about 0.5 weight percent to about 5 weight percent) of K in terms of $K_2O$, higher than or equal to about 10 weight percent and lower than or equal to about 25 weight percent (i.e., from about 10 weight percent to about 25 weight percent) of B in terms of $B_2O_3$, higher than or equal to about 70 weight percent and lower than or equal to about 85 weight percent (i.e., from about 70 weight percent to about 85 weight percent) of Si in terms of $SiO_2$, and higher than or equal to about 0 weight percent and lower than or equal to about 5 weight percent (i.e., from about 0 weight percent to about 5 weight percent) of Al in terms of $Al_2O_3$.

A glass ceramic material is prepared by adding $SiO_2$, $Al_2O_3$, and the like as fillers to the glass material.

Preparation of Glass Ceramic Sheets

Initially, a glass ceramic material, an organic binder, such as polyvinyl butyral resin, an organic solvent, such as ethanol and toluene, a plasticizer, and the like are mixed to prepare glass ceramic slurry. Subsequently, the glass ceramic slurry is molded into a sheet shape having a predetermined thickness by doctor blade or the like and then stamped into a predetermined shape to prepare glass ceramic sheets.

Preparation of Ferrite Material

Initially, $Fe_2O_3$, ZnO, CuO, and NiO are weighed at a predetermined ratio. The oxides may contain inevitable impurities. Subsequently, these oxides are mixed in a wet state and then ground. At this time, an additive, such as $Mn_3O_4$, $Co_3O_4$, $SnO_2$, $Bi_2O_3$, and $SiO_2$, may be added. The obtained ground product is dried and temporarily fired. In this way, powder ferrite material is prepared.

A composition of the ferrite material is desirably higher than or equal to about 40 mole percent and lower than or equal to about 49.5 mole percent (i.e., from about 40 mole percent to about 49.5 mole percent) of $Fe_2O_3$, higher than or equal to about 5 mole percent and lower than or equal to about 35 mole percent (i.e., from about 5 mole percent to about 35 mole percent) of ZnO, higher than or equal to about 6 mole percent and lower than or equal to about 12 mole percent (i.e., from about 6 mole percent to about 12 mole percent) of CuO, and higher than or equal to about 8 mole percent and lower than or equal to about 40 mole percent (i.e., from about 8 mole percent to about 40 mole percent) of NiO.

Preparation of Ferrite Sheets

Initially, a ferrite material, an organic binder, such as polyvinyl butyral resin, an organic solvent, such as ethanol and toluene, and the like are mixed and ground to prepare ferrite slurry. Subsequently, the ferrite slurry is molded into a sheet shape having a predetermined thickness by doctor blade or the like and then stamped into a predetermined shape to prepare ferrite sheets.

Formation of Conductor Patterns

An electrically conductive paste, such as Ag paste, is applied onto glass ceramic sheets by screen printing or the like to form conductor patterns for coil conductors, corresponding to the coil conductors shown in FIG. 2, conductor patterns for extended electrodes, corresponding to the extended electrodes shown in FIG. 2, conductor patterns for lands, corresponding to the lands shown in FIG. 2, conductor patterns for via conductors, corresponding to the via conductors shown in FIG. 2, and conductor patterns for dummy conductors, corresponding to the dummy conductors shown in FIG. 2. In forming conductor patterns for via conductors, laser is irradiated to predetermined points of the glass ceramic sheets to form via holes in advance, and the via holes are filled with an electrically conductive paste.

Preparation of Laminated Body Block

Initially, the glass ceramic sheets each having a conductor pattern are laminated in the height direction in order shown in FIG. 2. A predetermined number of glass ceramic sheets each having no conductor pattern may be further laminated on each side of the laminated body in the height direction.

Subsequently, a predetermined number of ferrite sheets are laminated on each side of the laminated body of the glass ceramic sheets in the height direction. A predetermined number of glass ceramic sheets may be further laminated on each side of the laminated body in the height direction.

After that, the laminated body of glass ceramic sheets and ferrite sheets is pressure bonded by warm isostatic press (WIP) or the like to prepare a laminated body block.

Preparation of Element Body and Coils

Initially, the laminated body block is cut into a predetermined size by a dicer or the like to prepare diced chips. Subsequently, the diced chips are fired. At this time, the glass ceramic sheets and the ferrite sheets each become an electrically insulating layer, and the conductor patterns for coil conductors, the conductor patterns for extended electrodes, the conductor patterns for lands, the conductor patterns for via conductors, and the conductor patterns for dummy conductors respectively become coil conductors, extended electrodes, lands, via conductors, and dummy conductors. In this way, an element body made up of a plurality of electrically insulating layers laminated in the height direction, a first coil provided in the element body, and a second coil provided in the element body and electrically insulated from the first coil are prepared. A first extended electrode connected to one end of the first coil and a third extended electrode connected to one end of the second coil are exposed at the first side surface of the element body. A second extended electrode connected to the other end of the first coil and a fourth extended electrode connected to the other end of the second coil are exposed at the second side surface of the element body.

Corner portions and ridge portions of the element body may be rounded by applying, for example, barrel polishing.

Formation of Outer Electrodes

Initially, an electrically conductive paste containing Ag and glass frit is applied to at least four points in total, that is, a point where the first extended electrode is exposed at the first side surface of the element body, a point where the second extended electrode is exposed at the second side surface of the element body, a point where the third extended electrode is exposed at the first side surface of the element body, and a point where the fourth extended electrode is exposed at the second side surface of the element body. Subsequently, the obtained coatings are fired to form base electrode layers on the surface of the element body. After that, an Ni plating layer, and an Sn plating layer are sequentially formed on the surface of each base electrode layer by electrolytic plating or the like. In this way, a first outer electrode electrically connected to one end of the first coil, a second outer electrode electrically connected to the other end of the first coil, a third outer electrode electrically connected to one end of the second coil, and a fourth outer electrode electrically connected to the other end of the second coil are formed.

Thus, the common mode choke coil according to the preferred embodiments of the present disclosure, illustrated in FIG. 1, FIG. 2, and the like is manufactured.

EXAMPLES

Hereinafter, examples in which the common mode choke coil according to the preferred embodiments of the present disclosure is further specifically disclosed will be described. The preferred embodiments of the present disclosure are not limited to only these examples.

Example 1

A common mode choke coil of Example 1 was manufactured by the following method.

Preparation of Glass Ceramic Material

Initially, $K_2O$, $B_2O_3$, $SiO_2$, and $Al_2O_3$ were weighed at a predetermined ratio and mixed in a melting pot made of platinum. Subsequently, the obtained mixture was fired at a temperature of higher than or equal to about 1500° C. and lower than or equal to about 1600° C. (i.e., from about 1500° C. to about 1600° C.) to be melted. After that, the obtained melt was rapidly cooled to prepare a glass material.

Subsequently, the glass material was ground such that the mean particle diameter $D_{50}$ was greater than or equal to about 1 μm and less than or equal to about 3 μm (i.e., from about 1 μm to about 3 μm) to prepare glass powder. $SiO_2$ powder (quartz powder) and $Al_2O_3$ powder (alumina powder) each having a mean particle diameter $D_{50}$ of greater than or equal to about 0.5 μm and less than or equal to about 2.0 μm (i.e., from about 0.5 μm to about 2.0 μm) were prepared as fillers. Here, a mean particle diameter $D_{50}$ is a particle diameter equivalent to a cumulative percentage of 50 percent on a volumetric basis. The $SiO_2$ powder and the $Al_2O_3$ powder were added to the glass powder to prepare a glass ceramic material.

Preparation of Glass Ceramic Sheets

Initially, a glass ceramic material, an organic binder, such as polyvinyl butyral resin, an organic solvent, such as ethanol and toluene, and a plasticizer were put in a ball mill together with PSZ media and mixed to prepare glass ceramic slurry. Subsequently, the glass ceramic slurry was molded into a sheet shape having a thickness of greater than or equal to about 20 μm and less than or equal to about 30 μm (i.e., from about 20 μm to about 30 μm) by doctor blade and then stamped into a substantially rectangular shape to prepare glass ceramic sheets.

Preparation of Ferrite Material

Initially, $Fe_2O_3$, ZnO, CuO, and NiO were weighed at a predetermined ratio. Subsequently, these oxides, pure water, and a dispersant are put in a ball mill together with PSZ media and mixed, and then ground. The obtained ground product was dried and then temporarily fired for longer than or equal to about two hours and shorter than or equal to about three hours at a temperature of higher than or equal to about 700° C. and lower than or equal to about 800° C. (i.e., from about 700° C. to about 800° C.). In this way, powder ferrite material was prepared.

Preparation of Ferrite Sheets

Initially, the ferrite material, an organic binder, such as polyvinyl butyral resin, and an organic solvent, such as ethanol and toluene, were put in a ball mill together with PSZ media and mixed, and then ground to prepare ferrite slurry. Subsequently, the ferrite slurry was molded into a sheet shape by doctor blade and then stamped into a substantially rectangular shape to prepare ferrite sheets.

Formation of Conductor Patterns

Ag paste was applied onto the glass ceramic sheets by screen printing to form conductor patterns for coil conductors, corresponding to the coil conductors shown in FIG. 2, conductor patterns for extended electrodes, corresponding to the extended electrodes shown in FIG. 2, conductor patterns for lands, corresponding to the lands shown in FIG. 2, conductor patterns for via conductors, corresponding to the via conductors shown in FIG. 2, and conductor patterns for dummy conductors, corresponding to the dummy conductors shown in FIG. 2. In forming conductor patterns for via conductors, laser was irradiated to predetermined points of the glass ceramic sheets to form via holes in advance, and the via holes were filled with the electrically conductive paste.

Preparation of Laminated Body Block

Initially, the glass ceramic sheets each having the conductor patterns were laminated in the height direction in order shown in FIG. 2. A predetermined number of glass ceramic sheets each having no conductor pattern were further laminated on each side of the laminated body in the height direction.

Subsequently, a predetermined number of ferrite sheets were laminated on each side of the laminated body of the glass ceramic sheets in the height direction.

After that, the laminated body of the glass ceramic sheets and the ferrite sheets was pressure bonded by warm isostatic press to prepare a laminated body block. The pressure bonding conditions were a temperature of 80° C. and a pressure of 100 MPa.

Preparation of Element Body and Coils

Initially, the laminated body block was cut into a predetermined size by a dicer to prepare diced chips. Subsequently, the diced chips were fired for longer than or equal to about an hour and shorter than or equal to about two hours at a temperature of higher than or equal to about 860° C. and lower than or equal to about 920° C. (i.e., from about 860° C. to about 920° C.). At this time, the glass ceramic sheets and the ferrite sheets each became an electrically insulating layer, and the conductor patterns for coil conductors, the conductor patterns for extended electrodes, the conductor patterns for lands, the conductor patterns for via conductors, and the conductor patterns for dummy conductors respectively became coil conductors, extended electrodes, lands, via conductors, and dummy conductors. In this way, the element body made up of the plurality of electrically insulating layers laminated in the height direction, the first coil provided in the element body, and the second coil provided in the element body and electrically insulated from the first coil were prepared. A first extended electrode connected to one end of the first coil and a third extended electrode connected to one end of the second coil were exposed at the first side surface of the element body. A second extended electrode connected to the other end of the first coil and a fourth extended electrode connected to the other end of the second coil were exposed at the second side surface of the element body.

Subsequently, the element body was put in a rotating barrel machine together with media and the element body was applied to barrel polishing to round corner portions and ridge portions.

Formation of Outer Electrodes

Initially, an electrically conductive paste containing Ag and glass frit was applied to at least four points in total, that is, a point where the first extended electrode was exposed at the first side surface of the element body, a point where the second extended electrode was exposed at the second side surface of the element body, a point where the third extended electrode was exposed at the first side surface of the element body, and a point where the fourth extended electrode was exposed at the second side surface of the element body. Subsequently, the obtained coatings were fired at a temperature of 800° C. to form base electrode layers on the surface of the element body. After that, an Ni plating layer and an Sn plating layer were sequentially formed on the surface of each base electrode layer by electrolytic plating. In this way, a first outer electrode electrically connected to one end of the first coil, a second outer electrode electrically connected to the other end of the first coil, a third outer electrode electrically connected to one end of the second coil, and a fourth outer electrode electrically connected to the other end of the second coil were formed.

The common mode choke coil of Example 1 was manufactured as described above. The common mode choke coil of Example 1 had a length of about 0.65 mm in the length direction, a length of about 0.50 mm in the width direction, an a length of about 0.30 mm in the height direction.

Comparative Example 1

A common mode choke coil of Comparative Example 1 was manufactured as in the case of the common mode choke coil of Example 1 except that no conductor patterns for dummy conductors were formed, that is, no dummy conductors were formed. The common mode choke coil of Comparative Example 1 also had the same size as the common mode choke coil of Example 1.

Evaluation

For the common mode choke coil of Example 1 and the common mode choke coil of Comparative Example 1, a direct current resistance between the first outer electrode and the second outer electrode and a direct current resistance between the third outer electrode and the fourth outer electrode were measured. When a direct current resistance between the first outer electrode and the second outer electrode was infinite, it was determined that the first coil had a break. When a direct current resistance between the third outer electrode and the fourth outer electrode was infinite, it was determined that the second coil had a break.

As a result, for the common mode choke coil of Example 1, there were no samples on which it was determined that the first coil or the second coil had a break, and the rate of breakage was 0 ppm.

On the other hand, for the common mode choke coil of Comparative Example 1, samples on which it was determined that the first coil had a break were also the ones on which it was determined that the second coil had a break, and the rate of breakage was about 30 ppm. When the samples on which it was determined that the first coil and the second coil had a break were actually inspected, the first outer via conductor and the land to be connected to the first outer via conductor were separated in the cross section as shown in FIG. 4, and the second outer via conductor and the land to be connected to the second outer via conductor were separated in the cross section as shown in FIG. 5.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A common mode choke coil comprising:

an element body including a plurality of electrically insulating layers laminated in a height direction;

a first coil, provided in the element body, and including a first coil conductor provided on a surface of a first electrically insulating layer, a second coil conductor provided on a surface of a second electrically insulating layer, and a third coil conductor provided on a surface of a third electrically insulating layer, such that the first coil conductor, the second coil conductor, and the third coil conductor are laminated in the height direction together with the first electrically insulating layer, the second electrically insulating layer, and the third electrically insulating layer and electrically connected, and the second coil conductor and the third coil conductor are electrically connected via a first outer via conductor provided at a position that overlaps partially or totally a radially outer end of the second coil conductor and a radially outer end of the third coil conductor when viewed in the height direction;

a second coil provided in the element body and electrically insulated from the first coil, the second coil including a fourth coil conductor provided on a surface of a fourth electrically insulating layer, a fifth coil conductor provided on a surface of a fifth electrically insulating layer, and a sixth coil conductor provided on a surface of a sixth electrically insulating layer, such that the fourth coil conductor, the fifth coil conductor, and the sixth coil conductor are laminated in the height direction together with the fourth electrically insulating layer, the fifth electrically insulating layer, and the sixth electrically insulating layer and electrically connected;

a first outer electrode provided on a surface of the element body and electrically connected to one end of the first coil;

a second outer electrode provided on the surface of the element body and electrically connected to an other end of the first coil;

a third outer electrode provided on the surface of the element body and electrically connected to one end of the second coil;

a fourth outer electrode provided on the surface of the element body and electrically connected to an other end of the second coil; and a first dummy conductor provided on the surface of at least one of the electrically insulating layers, consisting of the first electrically insulating layer, the fourth electrically insulating layer, the fifth electrically insulating layer, and the sixth electrically insulating layer, provided at a position other than between the second electrically insulating layer and the third electrically insulating layer, the first dummy conductor overlaps partially or totally the first outer via conductor when viewed in the height direction and is electrically insulated from all the coil conductors.

2. The common mode choke coil according to claim 1, wherein all the electrically insulating layers consisting of the first electrically insulating layer, the fourth electrically insulating layer, the fifth electrically insulating layer, and the sixth electrically insulating layer are provided at positions other than between the second electrically insulating layer and the third electrically insulating layer, and the first dummy conductor is provided on the surface of each of the first electrically insulating layer, the fourth electrically insulating layer, the fifth electrically insulating layer, and the sixth electrically insulating layer.

3. The common mode choke coil according to claim 2, further comprising:

a second dummy conductor provided on the surface of each of the first electrically insulating layer, the second electrically insulating layer, the third electrically insulating layer, the fourth electrically insulating layer, the fifth electrically insulating layer, and the sixth electrically insulating layer, and wherein, where a straight line passing through a center of the electrically insulating layers when viewed in the height direction and extending in a long-side direction of the electrically insulating layers is defined, each of the second dummy conductors is symmetric with the first outer via conductor with respect to the straight line and electrically insulated from all the coil conductors.

4. The common mode choke coil according to claim 1, wherein the fifth coil conductor and the sixth coil conductor are electrically connected via a second outer via conductor provided at a position that overlaps partially or totally a radially outer end of the fifth coil conductor and a radially outer end of the sixth coil conductor when viewed in the height direction, and the common mode choke coil further comprises a third dummy conductor provided on the surface of at least one of the electrically insulating layers, consisting of the first electrically insulating layer, the second electrically insulating layer, the third electrically insulating layer, and the fourth electrically insulating layer, provided at a position other than between the fifth electrically insulating layer and the sixth electrically insulating layer, the third dummy conductor overlaps partially or totally the second outer via conductor when viewed in the height direction and is electrically insulated from all the coil conductors.

5. The common mode choke coil according to claim 4, wherein all of the first electrically insulating layer, the second electrically insulating layer, the third electrically insulating layer, and the fourth electrically insulating layer are provided at positions other than between the fifth electrically insulating layer and the sixth electrically insulating layer, and the third dummy conductor is provided on the surface of each of the first electrically insulating layer, the second electrically insulating layer, the third electrically insulating layer, and the fourth electrically insulating layer.

6. The common mode choke coil according to claim 5, further comprising:

a fourth dummy conductor provided on the surface of each of the first electrically insulating layer, the second electrically insulating layer, the third electrically insulating layer, the fourth electrically insulating layer, the fifth electrically insulating layer, and the sixth electrically insulating layer, and wherein, where a straight line passing through a center of the electrically insulating layers when viewed in the height direction and extending in a long-side direction of the electrically insulating layers is defined, each of the fourth dummy conductors is symmetric with the second outer via conductor with respect to the straight line and electrically insulated from all the coil conductors.

7. The common mode choke coil according to claim 4, wherein when viewed in the height direction, the first outer via conductor and the second outer via conductor are symmetric with respect to a center of the electrically insulating layers.

8. The common mode choke coil according to claim 1, wherein the first coil further includes a seventh coil conductor provided on a surface of a seventh electrically insulating layer, and the second coil further includes an eighth coil conductor provided on a surface of an eighth electrically insulating layer.

9. The common mode choke coil according to claim 8, wherein in the element body, the seventh electrically insulating layer, the fourth electrically insulating layer, the third electrically insulating layer, the second electrically insulating layer, the fifth electrically insulating layer, the sixth electrically insulating layer, the first electrically insulating layer, and the eighth electrically insulating layer are sequentially laminated in the height direction.

10. The common mode choke coil according to claim 2, wherein the fifth coil conductor and the sixth coil conductor are electrically connected via a second outer via conductor provided at a position that overlaps partially or totally a radially outer end of the fifth coil conductor and a radially outer end of the sixth coil conductor when viewed in the height direction, and the common mode choke coil further comprises a third dummy conductor provided on the surface of at least one of the electrically insulating layers, consisting of the first electrically insulating layer, the second electrically insulating layer, the third electrically insulating layer, and the fourth electrically insulating layer, provided at a position other than between the fifth electrically insulating layer and the sixth electrically insulating layer, the third dummy conductor overlaps partially or totally the second outer via conductor when viewed in the height direction and is electrically insulated from all the coil conductors.

11. The common mode choke coil according to claim 3, wherein the fifth coil conductor and the sixth coil conductor are electrically connected via a second outer via conductor provided at a position that overlaps partially or totally a radially outer end of the fifth coil conductor and a radially outer end of the sixth coil conductor when viewed in the height direction, and the common mode choke coil further comprises a third dummy conductor provided on the surface of at least one of the electrically insulating layers, consisting of the first electrically insulating layer, the second electrically insulating layer, the third electrically insulating layer, and the fourth electrically insulating layer, provided at a position other than between the fifth electrically insulating layer and the sixth electrically insulating layer, the third dummy conductor overlaps partially or totally the second outer via conductor when viewed in the height direction and is electrically insulated from all the coil conductors.

12. The common mode choke coil according to claim 5, wherein when viewed in the height direction, the first outer via conductor and the second outer via conductor are symmetric with respect to a center of the electrically insulating layers.

13. The common mode choke coil according to claim 6, wherein when viewed in the height direction, the first outer via conductor and the second outer via conductor are symmetric with respect to a center of the electrically insulating layers.

14. The common mode choke coil according to claim 10, wherein when viewed in the height direction, the first outer via conductor and the second outer via conductor are symmetric with respect to a center of the electrically insulating layers.

15. The common mode choke coil according to claim 2, wherein the first coil further includes a seventh coil conductor provided on a surface of a seventh electrically insulating layer, and the second coil further includes an eighth coil conductor provided on a surface of an eighth electrically insulating layer.

16. The common mode choke coil according to claim 3, wherein the first coil further includes a seventh coil conductor provided on a surface of a seventh electrically insulating layer, and the second coil further includes an eighth coil conductor provided on a surface of an eighth electrically insulating layer.

17. The common mode choke coil according to claim 4, wherein the first coil further includes a seventh coil conductor provided on a surface of a seventh electrically insulating layer, and the second coil further includes an eighth coil conductor provided on a surface of an eighth electrically insulating layer.

18. The common mode choke coil according to claim 5, wherein the first coil further includes a seventh coil conductor provided on a surface of a seventh electrically insulating layer, and the second coil further includes an eighth coil conductor provided on a surface of an eighth electrically insulating layer.

19. The common mode choke coil according to claim 6, wherein the first coil further includes a seventh coil conductor provided on a surface of a seventh electrically insulating layer, and the second coil further includes an eighth coil conductor provided on a surface of an eighth electrically insulating layer.

20. The common mode choke coil according to claim 7, wherein the first coil further includes a seventh coil conductor provided on a surface of a seventh electrically insulating layer, and the second coil further includes an eighth coil conductor provided on a surface of an eighth electrically insulating layer.

* * * * *